US012253738B2

(12) United States Patent
Lee et al.

(10) Patent No.: US 12,253,738 B2
(45) Date of Patent: Mar. 18, 2025

(54) VOICE COIL MOTOR

(71) Applicant: LG INNOTEK CO., LTD., Seoul (KR)

(72) Inventors: Seongmin Lee, Seoul (KR); Sangok Park, Seoul (KR); Sangjun Min, Seoul (KR); Kyoungho Yoo, Seoul (KR); Taejin Jung, Seoul (KR); Taemin Ha, Seoul (KR); Seungki Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/481,577

(22) Filed: Oct. 5, 2023

(65) Prior Publication Data
US 2024/0027725 A1 Jan. 25, 2024

Related U.S. Application Data

(63) Continuation of application No. 17/129,305, filed on Dec. 21, 2020, now Pat. No. 11,809,014, which is a
(Continued)

(30) Foreign Application Priority Data

Jul. 30, 2010 (KR) .................. 10-2010-0074002
Sep. 8, 2010 (KR) .................. 10-2010-0087943
(Continued)

(51) Int. Cl.
*G02B 7/04* (2021.01)
*G02B 7/02* (2021.01)
(Continued)

(52) U.S. Cl.
CPC .............. *G02B 7/04* (2013.01); *G02B 7/023* (2013.01); *H02K 5/04* (2013.01); *H02K 41/035* (2013.01);
(Continued)

(58) Field of Classification Search
CPC .......... H04N 5/44; H04N 23/51; H04N 23/55; G02B 7/04; G02B 7/023; H02K 5/04; H02K 41/035; H02K 41/0356
(Continued)

(56) References Cited

U.S. PATENT DOCUMENTS 4,314,295 A * 2/1982 Frandsen ............... H02K 41/03
360/78.12
4,318,145 A * 3/1982 Frandsen ............... H02K 41/03
(Continued)

FOREIGN PATENT DOCUMENTS

CN        201018387 Y  *  2/2008
CN        201096947 Y  *  8/2008
(Continued)

OTHER PUBLICATIONS

Office Action dated Aug. 21, 2019 in U.S. Appl. No. 16/219,497.
(Continued)

*Primary Examiner* — Alex W Mok
(74) *Attorney, Agent, or Firm* — Saliwanchik, Lloyd & Eisenschenk

(57) ABSTRACT

A VCM (voice coil motor) is disclosed, the VCM including: a rotor including a lens-accommodating, both ends opened cylindrical bobbin and a coil block including a coil wound on a periphery of the bobbin; a stator including a cylindrical yoke formed with a lens-exposing opening, a plurality of magnets disposed inside the yoke and opposite to the coil block, and a housing disposed inside the yoke to fix the plurality of magnets; and an elastic member elastically supporting the bobbin.

20 Claims, 16 Drawing Sheets

Related U.S. Application Data continuation of application No. 16/219,497, filed on Dec. 13, 2018, now Pat. No. 10,914,914, which is a continuation of application No. 15/399,447, filed on Jan. 5, 2017, now Pat. No. 10,185,117, which is a continuation of application No. 14/884,349, filed on Oct. 15, 2015, now Pat. No. 9,575,283, which is a continuation of application No. 14/457,984, filed on Aug. 12, 2014, now Pat. No. 9,190,891, which is a continuation of application No. 13/193,706, filed on Jul. 29, 2011, now Pat. No. 8,836,177.

(30) Foreign Application Priority Data

Nov. 18, 2010 (KR) .................. 10-2010-0115163
Dec. 1, 2010 (KR) .................. 10-2010-0121320

(51) Int. Cl.
  *H02K 5/04*      (2006.01)
  *H02K 41/035*    (2006.01)
  *H04N 5/44*      (2011.01)
  *H04N 23/51*     (2023.01)
  *H04N 23/55*     (2023.01)

(52) U.S. Cl.
  CPC .......... *H02K 41/0356* (2013.01); *H04N 5/44* (2013.01); *H04N 23/51* (2023.01); *H04N 23/55* (2023.01)

(58) Field of Classification Search
  USPC ........................................ 359/824
  See application file for complete search history.

(56) References Cited

U.S. PATENT DOCUMENTS

| | | | | |
|---|---|---|---|---|
| 4,331,990 A * | 5/1982 | Frandsen | H02K 41/03 | 360/78.12 |
| 4,845,393 A * | 7/1989 | Burgess | H04B 15/025 | 310/239 |
| 5,247,410 A * | 9/1993 | Ebihara | G11B 5/54 | |
| 5,541,792 A * | 7/1996 | Kinoshita | G11B 5/54 | 360/246.8 |
| 5,801,904 A * | 9/1998 | Kinoshita | G11B 5/54 | |
| 5,828,503 A * | 10/1998 | Kaneda | G02B 7/102 | 396/85 |
| 6,204,582 B1 * | 3/2001 | Keller | H02K 5/00 | 310/71 |
| 6,703,727 B2 * | 3/2004 | Miller | H02K 41/0354 | 360/266.8 |
| 7,227,285 B2 * | 6/2007 | Osaka | H02K 41/0356 | 359/814 |
| 7,375,928 B2 * | 5/2008 | Kim | G11B 5/54 | |
| 7,463,436 B2 * | 12/2008 | Takahashi | G02B 7/08 | 396/55 |
| 7,649,703 B2 * | 1/2010 | Shiraki | G02B 7/08 | 369/147 |
| 8,031,439 B2 * | 10/2011 | Lee | G11B 5/5569 | 360/264.7 |
| 8,111,484 B2 * | 2/2012 | Kim | G11B 5/54 | 360/256.2 |
| 8,194,336 B2 * | 6/2012 | Kimoto | H02K 41/0356 | 348/208.11 |
| 8,368,255 B2 * | 2/2013 | Park | H02K 41/0356 | 310/15 |
| 8,368,256 B2 * | 2/2013 | Yoo | H02K 41/0356 | 310/20 |
| 8,638,510 B2 * | 1/2014 | Lee | H02K 41/035 | 359/814 |
| 8,810,936 B2 * | 8/2014 | Min | G02B 7/04 | 310/12.16 |
| 8,836,177 B2 * | 9/2014 | Lee | G02B 7/023 | 310/12.16 |
| 8,896,749 B2 * | 11/2014 | Kudo | H02K 41/0356 | 348/374 |
| 9,094,592 B2 * | 7/2015 | Oh | H04N 23/57 | |
| 9,190,891 B2 * | 11/2015 | Lee | H04N 5/44 | |
| 9,197,796 B2 * | 11/2015 | Oh | H04N 23/57 | |
| 9,250,415 B2 * | 2/2016 | Min | G02B 7/04 | |
| 9,294,661 B2 * | 3/2016 | Choi | H04N 23/51 | |
| 9,300,196 B2 * | 3/2016 | Han | H02K 41/035 | |
| 9,338,337 B2 * | 5/2016 | Lee | H04N 23/57 | |
| 9,531,933 B2 * | 12/2016 | Oh | H04N 23/52 | |
| 9,575,283 B2 * | 2/2017 | Lee | G02B 7/023 | |
| 9,658,425 B2 * | 5/2017 | Min | G02B 7/04 | |
| 9,906,694 B2 * | 2/2018 | Lee | H04N 23/51 | |
| 10,082,637 B2 * | 9/2018 | Min | H02K 41/031 | |
| 10,185,117 B2 * | 1/2019 | Lee | G02B 7/04 | |
| 2005/0264940 A1 * | 12/2005 | Kim | G11B 5/54 | |
| 2006/0203627 A1 * | 9/2006 | Osaka | G03B 13/36 | 369/44.16 |
| 2007/0268595 A1 * | 11/2007 | Ho | G02B 7/102 | 359/694 |
| 2007/0280667 A1 * | 12/2007 | Shin | G03B 3/10 | 396/133 |
| 2008/0007850 A1 * | 1/2008 | Huang | G02B 7/08 | 310/311 |
| 2008/0036304 A1 * | 2/2008 | Ho | H02K 41/0356 | 359/260 |
| 2008/0036307 A1 * | 2/2008 | Lu | H02N 2/186 | 310/306 |
| 2008/0137234 A1 * | 6/2008 | Lee | G11B 5/5569 | 360/245.9 |
| 2008/0164771 A1 * | 7/2008 | Huang | H02K 41/0356 | 310/12.31 |
| 2008/0231974 A1 * | 9/2008 | Jung | G02B 7/023 | 359/824 |
| 2008/0247063 A1 * | 10/2008 | Otsuki | G02B 7/04 | 359/811 |
| 2008/0259468 A1 * | 10/2008 | Chung | G02B 7/08 | 359/814 |
| 2008/0284255 A1 * | 11/2008 | Liu | G02B 7/102 | 310/12.19 |
| 2009/0109554 A1 * | 4/2009 | Christison | G02B 7/023 | 359/823 |
| 2009/0225452 A1 * | 9/2009 | Wu | G02B 7/023 | 359/824 |
| 2009/0237815 A1 * | 9/2009 | Kim | G11B 7/0935 | 359/811 |
| 2009/0251807 A1 * | 10/2009 | Liao | G02B 7/08 | 359/823 |
| 2009/0262438 A1 * | 10/2009 | Chou | H02K 41/0356 | 359/696 |
| 2009/0284854 A1 * | 11/2009 | Chou | H02K 41/0356 | 359/824 |
| 2009/0289508 A1 * | 11/2009 | Sakamoto | H02K 41/0358 | 310/12.26 |
| 2010/0002317 A1 * | 1/2010 | Osaka | G02B 7/08 | 359/824 |
| 2010/0014194 A1 * | 1/2010 | Kim | G11B 5/54 | |
| 2010/0060994 A1 * | 3/2010 | Akabane | G02B 7/08 | 359/696 |
| 2010/0073785 A1 * | 3/2010 | Park | G03B 3/10 | 310/14 |
| 2010/0117460 A1 * | 5/2010 | Liao | H02K 41/0356 | 310/12.16 |
| 2010/0133923 A1 * | 6/2010 | Liao | H02K 41/0356 | 310/12.02 |
| 2010/0149667 A1 * | 6/2010 | Wada | G02B 13/0035 | 359/824 |
| 2010/0271718 A1 * | 10/2010 | Ho | H01L 27/14625 | 359/829 |
| 2011/0031822 A1 * | 2/2011 | Chou | G02B 7/102 | 310/12.16 |
| 2011/0121666 A1 * | 5/2011 | Park | H02K 41/0356 | 310/15 |

(56) References Cited

U.S. PATENT DOCUMENTS

| | | | |
|---|---|---|---|
| 2011/0163616 A1* | 7/2011 | Kwon | H02K 41/0356 310/12.16 |
| 2011/0204731 A1* | 8/2011 | Yoo | H02K 41/0356 310/12.16 |
| 2012/0008220 A1* | 1/2012 | Lee | H02K 41/035 359/822 |
| 2012/0008221 A1* | 1/2012 | Min | G02B 7/02 359/824 |
| 2012/0025633 A1* | 2/2012 | Lee | H02K 41/035 310/12.16 |
| 2013/0119785 A1* | 5/2013 | Han | G02B 27/646 310/12.16 |
| 2013/0120648 A1* | 5/2013 | Oh | H04N 23/51 348/374 |
| 2013/0128108 A1* | 5/2013 | Oh | H04N 23/54 348/374 |
| 2014/0247389 A1* | 9/2014 | Lee | H04N 23/51 348/373 |
| 2014/0267767 A1* | 9/2014 | Choi | G03B 17/02 348/164 |
| 2014/0327978 A1* | 11/2014 | Min | H02K 41/0354 359/824 |
| 2014/0347556 A1* | 11/2014 | Lee | H02K 41/0356 348/373 |
| 2015/0301304 A1* | 10/2015 | Oh | H04N 23/51 359/823 |
| 2016/0033736 A1* | 2/2016 | Lee | G02B 7/023 359/824 |
| 2016/0057327 A1* | 2/2016 | Oh | H04N 23/57 348/164 |
| 2016/0147036 A1* | 5/2016 | Min | G02B 7/04 310/12.16 |
| 2016/0190905 A1* | 6/2016 | Han | G02B 7/102 359/557 |
| 2016/0255252 A1* | 9/2016 | Lee | H04N 23/51 348/373 |

FOREIGN PATENT DOCUMENTS

| | | | | |
|---|---|---|---|---|
| CN | 101546093 A | * | 9/2009 | G02B 7/026 |
| CN | 101546936 A | * | 9/2009 | H02K 11/01 |
| CN | 101552502 A | * | 10/2009 | H02K 1/2786 |
| CN | 101561544 A | * | 10/2009 | G02B 7/08 |
| CN | 101599685 A | * | 12/2009 | H02K 41/0356 |
| CN | 101752977 A | * | 6/2010 | G02B 7/102 |
| JP | 2006074990 A | * | 3/2006 | G02B 7/102 |
| JP | 2006079072 A | * | 3/2006 | G02B 7/102 |
| JP | 2008-154219 A | | 7/2008 | |
| JP | 2010160435 A | * | 7/2010 | |
| KR | 10-2007-0043567 A | | 4/2007 | |
| KR | 20070043567 A | * | 4/2007 | |
| KR | 10-2009-0026480 A | | 3/2009 | |
| KR | 10-2009-0032905 A | | 4/2009 | |
| KR | 20090032905 A | * | 4/2009 | |
| KR | 10-2010-0005660 A | | 1/2010 | |
| KR | 20100005660 A | * | 1/2010 | |
| KR | 10-2010-0048362 A | | 5/2010 | |
| KR | 20100048362 A | * | 5/2010 | |

OTHER PUBLICATIONS

Office Action dated Mar. 31, 2020 in U.S. Appl. No. 16/219,497.
Notice of Allowance dated Sep. 22, 2020 in U.S. Appl. No. 16/219,497.
Office Action dated Aug. 12, 2016 in Korean Application No. 10-2010-0074002.
Office Action dated Sep. 29, 2016 in Korean Application No. 10-2010-0087943.
Office Action dated Dec. 15, 2014 in Chinese Application No. 201110218910.3.
Office Action dated Dec. 5, 2016 in Korean Application No. 10-2010-0115163.
Office Action dated Dec. 9, 2016 in Korean Application No. 10-2010-0121320.
Office Action dated Aug. 2, 2013 in U.S. Appl. No. 13/193,706.
Office Action dated Dec. 30, 2013 in U.S. Appl. No. 13/193,706.
Notice of Allowance dated May 13, 2014 in U.S. Appl. No. 13/193,706.
Office Action dated Apr. 5, 2017 in Chinese Application No. 201510497826.8.
Office Action dated Feb. 27, 2019 in Korean Application No. 10-2019-0019125.
Office Action dated Dec. 2, 2020 in Chinese Application No. 201910769549.X.
Office Action dated Jul. 28, 2020 in Chinese Application No. 201910062885.0.
Office Action dated Jun. 17, 2021 in Chinese Application No. 201910769549.X.
Office Action dated Aug. 3, 2021 in Korean Application No. 10-2021-0001231.
Notice of Allowance dated Oct. 27, 2021 in Korean Application No. 10-2021-0001231.
Notice of Allowance dated May 30, 2022 in Korean Application No. 10-2021-0147376.
Notice of Allowance dated Dec. 5, 2022 in Korean Application No. 10-2022-0012702.
Office Action dated Aug. 5, 2022 in U.S. Appl. No. 17/129,305.
Notice of Allowance dated Jul. 5, 2023 in U.S. Appl. No. 17/129,305.

* cited by examiner

VOICE COIL MOTOR

CROSS-REFERENCE TO RELATED APPLICATIONS

This application is a continuation of U.S. application Ser. No. 17/129,305, filed Dec. 21, 2020; which is a continuation of U.S. application Ser. No. 16/219,497, filed Dec. 13, 2018, now U.S. Pat. No. 10,914,914, issued Feb. 9, 2021; which is a continuation of U.S. application Ser. No. 15/399,447, filed Jan. 5, 2017, now U.S. Pat. No. 10,185,117, issued Jan. 22, 2019; which is a continuation of U.S. application Ser. No. 14/884,349, filed Oct. 15, 2015, now U.S. Pat. No. 9,575,283, issued Feb. 21, 2017; which is a continuation of U.S. application Ser. No. 14/457,984, filed Aug. 12, 2014, now U.S. Pat. No. 9,190,891, issued Nov. 17, 2015; which is a continuation of U.S. application Ser. No. 13/193,706, filed Jul. 29, 2011, now U.S. Pat. No. 8,836,177, issued Sep. 16, 2014; which claims the benefit under 35 U.S.C. § 119 of Korean Application Nos. 10-2010-0074002, filed Jul. 30, 2010; 10-2010-0087943, filed Sep. 8, 2010; 10-2010-0115163, filed Nov. 18, 2010; and 10-2010-0121320, filed Dec. 1, 2010; all of which are hereby incorporated by reference in their entirety.

BACKGROUND OF THE DISCLOSURE

Field of the Disclosure

The present disclosure relates to a voice coil motor (VCM).

Discussion of the Related Art

Recently, a mobile phone mounted with a super-small high resolution digital camera has been developed. The super-small digital camera mounted on the mobile phone includes an image sensor changing an outside light to an image and a lens opposite to the image sensor.

The conventional super-small digital camera is fixedly mounted with the lens and the image sensor to have a trouble in obtaining a high quality image due to difficulty in adjusting a distance between the image sensor and the lens.

Recently, a lens driving device such as a voice coil motor has been developed to adjust a distance between a lens and an image sensor. The voice coil motor generally includes a bobbin secured with a lens, a coil block wound on a periphery of the bobbin, a magnet opposite to the coil block, a yoke securing the magnet, and a leaf spring elastically supporting the vertically-moving bobbin.

The magnet, one of the essential components of the conventional voice coil motor, is secured to an inner lateral surface of the yoke using an adhesive. However, in a case the magnet is secured to the inner lateral surface of the yoke using an adhesive, the magnet is separated from the yoke by a strong shock or a vibration applied to the yoke, and if the magnet is separated from the yoke, the bobbin is generated with a problem of defective driving.

Another problem encountered by the conventional voice coil motor is that a yoke is needed to secure a yoke the magnet opposite to the bobbin whereby the number of parts and assembly processes is increased Still another problem is that an aperture of the lens mounted on the bobbin cannot be increased due to an area occupied by the bobbin and the magnet.

BRIEF SUMMARY

The present disclosure is directed to cope with the above-mentioned problems and to provide a VCM (voice coil motor) configured to inhibit movement of a magnet inside a yoke by outside shock and vibration.

Technical problems to be solved by the present disclosure are not restricted to the above-mentioned description, and any other technical problems not mentioned so far will be clearly appreciated from the following description by the skilled in the art.

In one general aspect of the present disclosure, there is provided a VCM, (voice coil motor) comprising: a rotor including a lens-accommodating, both ends opened cylindrical bobbin and a coil block including a coil wound on a periphery of the bobbin; a stator including a cylindrical yoke formed with a lens-exposing opening, a plurality of magnets disposed inside the yoke and opposite to the coil block, and a housing disposed inside the yoke to fix the plurality of magnets; and an elastic member elastically supporting the bobbin.

In another general aspect of the present disclosure, there is provided a VCM (voice coil motor), comprising: a rotor including a lens-accommodating, both ends opened cylindrical bobbin and a coil block including a coil wound on a periphery of the bobbin; a stator including a plurality of flat magnets opposite to the coil block and a yoke formed with pocket units fixing both lateral surfaces of each flat magnet and a rear surface opposite to a front surface opposite to the coil block; and elastic member elastically supporting the bobbin.

In still another general aspect of the present disclosure, there is provided a VCM (voice coil motor), comprising: a rotor including a bobbin having a hollow hole mounted with a lens and a coil block arranged at a periphery of the bobbin; an elastic member elastically coupled to the bobbin; and a stator including an upper plate exposing the hollow hole, a housing including a lateral plate extended from an edge of the upper plate to encompass the rotor and formed with an accommodation hole, and a flat magnet secured to the accommodation hole, wherein the housing includes a disengagement prevention unit inhibiting the flat magnet from being disengaged from the lateral plate to a direction facing the coil block.

In still another general aspect of the present disclosure, there is provided a VCM (voice coil motor) comprising: a rotor including a lens-mounted bobbin and a coil block arranged at a periphery of the bobbin; a stator including a flat magnet arranged at a periphery of the coil block and a bottom spacer securing the flat magnet; an elastic member elastically supporting the bobbin; and a base in which the rotor, the bottom spacer and the elastic member are secured.

The VCM according to exemplary embodiments of the present disclosure has an advantageous effect in that a magnet arranged inside a yoke is press-fitted using a housing to inhibit a reduced driving efficiency and a driving imperfection of a rotor generated by movement of the magnet inside the yoke.

BRIEF DESCRIPTION OF THE DRAWINGS

The accompanying drawings, which are included to provide a further understanding of the present disclosure and are incorporated in the present disclosure and constitute a part of this application, and together with the description, serve to explain the principle of the disclosure. In the drawings.

DETAILED DESCRIPTION

Figure 1:
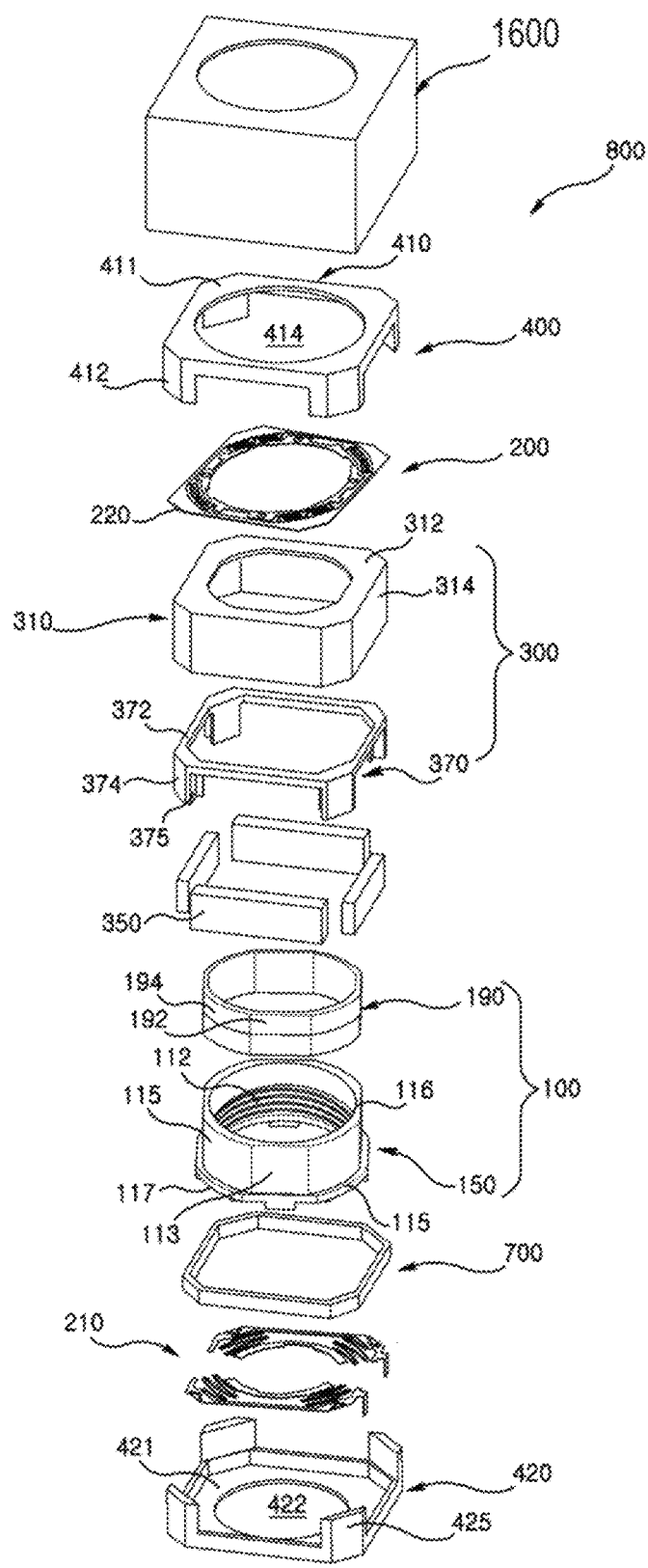
FIG. 1 is an exploded perspective view illustrating a VCM according to an exemplary embodiment of the present disclosure.

Advantages and features of the present invention may be understood more readily by reference to the following detailed description of exemplary embodiments and the accompanying drawings. Detailed descriptions of well-known functions, configurations or constructions are omitted for brevity and clarity so as not to obscure the description of the present disclosure with unnecessary detail. Thus, the present disclosure is not limited to the exemplary embodiments which will be described below, but may be implemented in other forms. In the drawings, the width, length, thickness, etc. of components may be exaggerated or reduced for the sake of convenience. Furthermore, throughout the descriptions, the same reference numerals will be assigned to the same elements in the explanations of the figures, and explanations that duplicate one another will be omitted. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges from less than one percent to ten percent.

Figure 2:
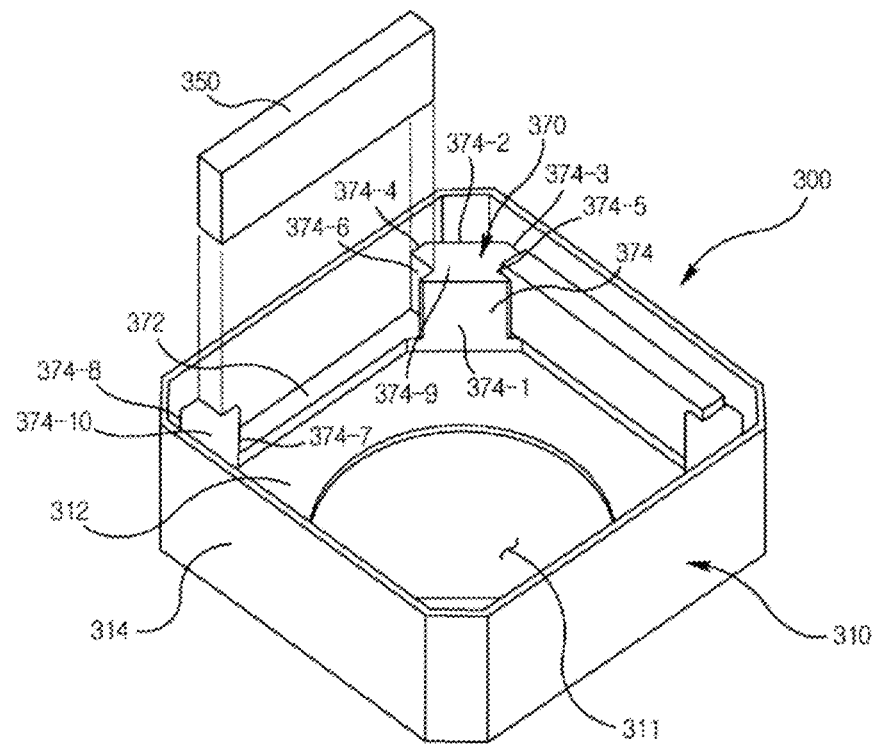
FIG. 2 is an exploded perspective view of a stator in FIG. 1.
Figure 3:
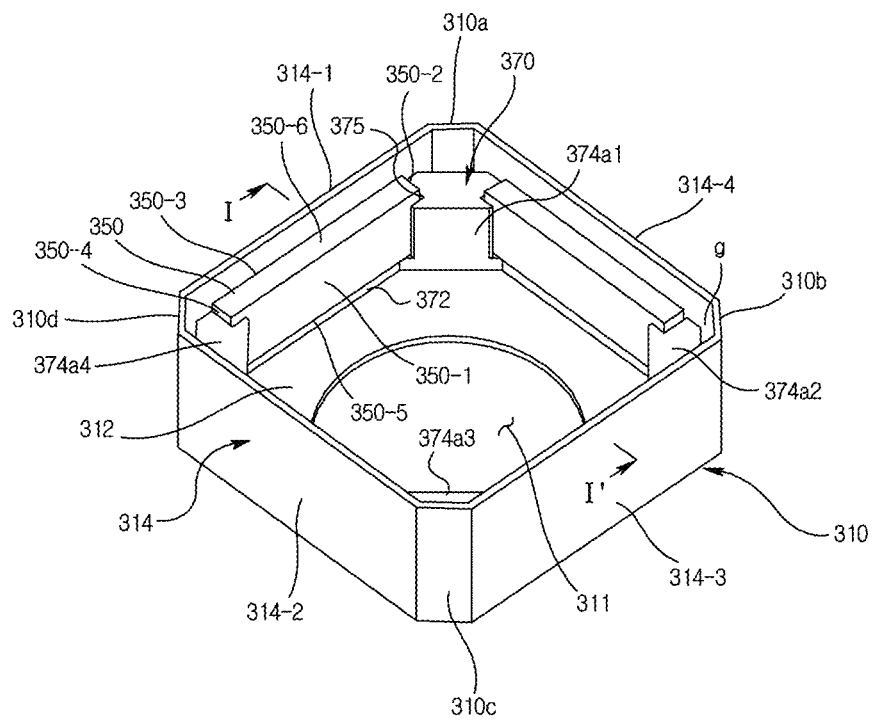
FIG. 3 is a coupled perspective view of a stator in FIG. 2.
Figure 4:
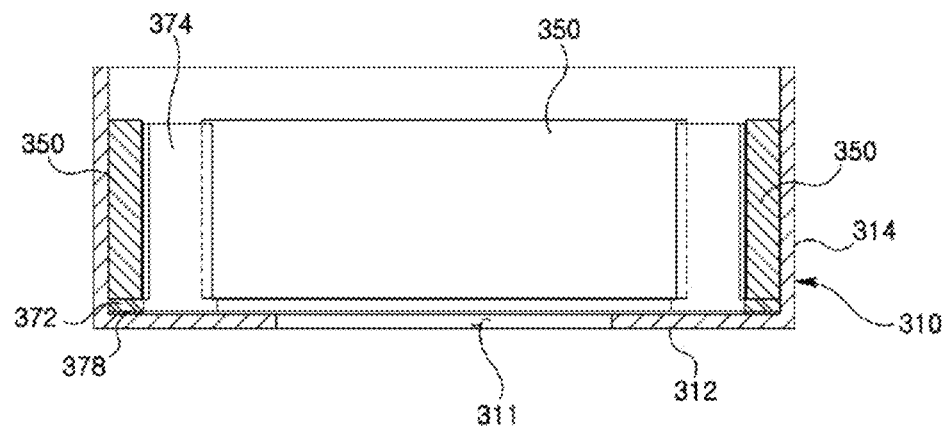
FIG. 4 is a cross-sectional view of line 'I-I' in FIG. 3.

FIG. 1 is an exploded perspective view illustrating a VCM according to an exemplary embodiment of the present disclosure, FIG. 2 is an exploded perspective view of a stator in FIG. 1, FIG. 3 is a coupled perspective view of a stator in FIG. 2, and FIG. 4 is a cross-sectional view of line 'I-I" in FIG. 3.

Referring to FIG. 1, a VCM (800) includes a rotor (100), an elastic member (200) and a stator (300). The VCM (800) may further include a case (400), a cover can (1600) and a spacer (700).

The rotor (100) includes a bobbin (150) and a coil block (190). The bobbin (150) takes the shape of both ends-opened barrel. The bobbin may take the shape of both ends-opened cylinder, for example. The bobbin serves to secure a lens opposite to an image sensor changing an outside light to an image.

An inner surface of the bobbin (150) is formed with a female screw unit (112) for accommodating the lens to the bobbin, and the female screw unit (112) may be formed with a lens fixing member (not shown) coupled to the lens.

Alternatively, it should be also appreciated that the lens is directly coupled to the female screw unit of the bobbin (150). A peripheral bottom distal end of the bobbin (150) is formed with a hitching sill (118) for supporting a coil block (190, described later).

The coil block (190) is arranged at a periphery of the bobbin (150), and secured by using the hitching sill (118) formed at the peripheral bottom of the bobbin (150).

The coil block (190) may be formed by winding a coil on the periphery of the bobbin (150) in the shape of a cylinder, or by inserting a cylindrically wound coil block (190) to the periphery of the bobbin (150). In a case the coil block (190) is formed by inserting a cylindrically wound coil block (190) to the periphery of the bobbin (150), an adhesive may be interposed between the coil block (190) and the bobbin (150).

The coil block (190) is electrically connected to first elastic members (210) of elastic member (200, described later), and a magnetic field is generated from the coil block (190) by a driving signal provided from the first elastic members (210). The rotor (100) is driven relative to a magnet (350) by a force generated by a magnetic field of the coil block (190) and a magnetic field of the magnet (350, described later).

In the exemplary embodiment of the present disclosure, a gap between a lens mounted on the bobbin (150) and an image sensor (not shown) opposite to the lens can be accurately adjusted by adjusting a level of a driving signal applied to the coil block (190).

The elastic member (200) includes a first elastic member (210) and a second elastic member (220). In the exemplary embodiment of the present disclosure, each of the first elastic member (210) and the second elastic member (220) may include a leaf spring.

The first elastic member (210) and the second elastic member (220) according to the exemplary embodiment of the present disclosure serve to elastically support the bobbin (150), inhibit the bobbin (150) from being disengaged from a predetermined position, and return the bobbin (150) lifted by the coil block (190) and the magnet (350) to an initial position.

The first elastic member (210) is coupled to a bottom surface (117) of the bobbin (150). The first elastic member (210) is coupled to a boss (not shown) protruded from the bottom surface (117) of the bobbin (150). The first elastic member (210) includes a through hole coupled to the boss protruded from the bottom surface (117) of the bobbin (150). A distal end of the boss is applied with heat and pressure after the first elastic member (210) is inserted into the boss protruded from the bottom surface (117) of the bobbin (150). An upper surface of the first elastic member (210) is secured to the boss by the distal end of the boss fused by the heat and pressure applied to the boss, whereby the first elastic member (210) is inhibited from being disengaged from bottom surface (117) of the bobbin (150).

The first elastic member (210) may be formed in a pair according to the exemplary embodiment of the present disclosure, and the pair of first elastic members (210) is mutually electrically insulated therebetween, and the electrically insulated pair of first elastic members (210) includes a connection terminal which is in turn electrically connected to an outside circuit substrate.

One distal end of the coil forming the coil block (190) and the other distal end facing the one distal end of the coil are electrically connected to the pair of first elastic members (210). As a result, the driving signal provided from the outside circuit substrate is provided to the coil block (190) through the first elastic members (210), and a magnetic field is generated from the coil block (190) by the driving signal.

The second elastic member (220) is coupled to an upper surface (116) opposite to the bottom surface (117) of the bobbin (150).

Referring to FIGS. 2, 3 and 4, the stator (300) includes a yoke (310), a magnet (350) and a housing (370) (for example, a magnet fixing member style housing). The yoke (310) includes an upper plate (312) and a lateral plate (314). The upper plate (312) and the lateral plate (314) may include a metal.

The yoke (310) including the metal serves to inhibit a magnetic flux generated from the magnet (350, described later) from leaking, and induce the magnetic flux generated from the magnet (350, described later) to direct to the coil block (190), whereby a driving efficiency of the rotor (100) can be further enhanced.

An upper plate (312) of the yoke (310) takes the shape of a square plate, for example, and the yoke (310) is centrally formed with an opening (311) exposing the lens mounted on the bobbin (150). The lateral plate (314) of the yoke (310) is extended from each edge of the upper plate (312) to a direction encompassing the coil block (190), where the upper plate (312) and the lateral plate (314) of the yoke (312) are integrally formed.

In the exemplary embodiment of the present disclosure, each of the magnets (350) takes the shape of a cuboidal plate, for example, and is arranged at an inner lateral surface of the lateral plate (314) of the yoke (310). For example, in a case four lateral plates (314) including a first lateral plate (314-1), a second lateral plate (314-2), a third lateral plate (314-3), and a fourth lateral plate (314-4) of the yoke (310) are formed, each of four magnets (350) is arranged at each of the four lateral plates (314-1 to 314-4). Each of the magnets (350) is arranged to face the coil block (190).

In the exemplary embodiment of the present disclosure, the cuboidal magnets (350) are arranged in parallel with each of the lateral plates (314), and each of the magnets (350) is arranged adjacent to the inner lateral surface of the lateral plate (314). Each of the magnets (350) comprises a first lateral surface (350-1) facing a coil, a second lateral surface (350-2) facing the coupling unit (374), a third lateral surface (350-3) disposed opposite to the first lateral surface (350-1), a fourth lateral surface (350-4) disposed opposite to the second lateral surface (350-2), an upper surface (350-5) facing the body (372), and a lower surface (350-6) disposed opposite to the upper surface (350-5). The each of the magnets (350) generates magnetic field, and a force generated by a magnetic field generated by the each magnet (350) and a magnetic field generated by the coil block (190) opposite to the magnets (350) drives the rotor (100).

A housing (370) secures the magnets (350) arranged inside the yoke (310). In the exemplary embodiment of the present disclosure, the magnets (350) can be inhibited from being moved or being disengaged from designated positions by shock or vibration applied from outside, by being fixed to the housing (370).

The housing (370) includes a body unit (372) and a coupling unit (374). The body unit (372) is arranged at an inner lateral surface of the upper plate (312) of the yoke (310), and takes the shape of an opening-formed frame. The opening of the body unit (372) takes the shape and size appropriate enough not to expose the lens of the bobbin (150). The body unit (372) serves as a base for securing the coupling unit (374) to a predetermined position.

In the exemplary embodiment of the present disclosure, the body unit (372) takes the shape of a square frame, for example. The body unit (372) may take various shapes based on arrangement of magnets (350) disposed inside the yoke (310). For example, in a case four magnets, each having the shape of a cuboidal plate, are arranged in a square shape, the body unit (372) takes the shape of a square frame. Alternatively, in a case a plurality of magnets, each having a curved plate shape, is arranged in a circle, the body unit (372) takes the shape of a circular frame.

A plurality of coupling units (374) is protruded from the body unit (372) along the lateral plate (314) of the yoke (310) and can include a first coupling unit (374a1), a second coupling unit (374a2), a third coupling unit (374a3), and a fourth coupling unit (374a4). Each of the coupling units (374) is formed at a position corresponding to a pair of magnets (350) adjacent to the magnets (350) arranged along the lateral plates (314) of yoke (310). The coupling units (374) and the magnets (350) are mutually coupled by press-fitting method. The coupling unit (374) comprises a first surface (374-1) facing a coil and a second surface (374-2) disposed opposite the first surface (374-1). In addition, the coupling unit (374) further comprises a third surface (374-3) coupled with the fourth lateral plate (314-4), a fourth surface (374-4) coupled with the first lateral plate (314-1), fifth (374-5) and sixth (374-6) surfaces facing the magnets 350, and a first bottom surface (374-9) disposed opposite to the body (372). The second surface (374-2) connects the third surface (374-3) and the fourth surface (374-4). An adjacent coupling unit (374) can comprise a seventh surface (374-7) facing the coil, an eighth surface (374-8) disposed opposite to the seventh surface (374-7), and a second bottom surface (374-10) disposed opposite to the yoke (372). It is noted that the surfaces (374-1-374-9) of the coupling unit (374), the lateral plates (314-1-314-4) of the yoke (310), and other elements are labeled (e.g., "first", "second") for convenience of differentiating items from each other, and the labels are applied arbitrarily (i.e., the "third" surface (374-3) can be thought of as a "first" surface, etc.). The yoke (310) can include corner parts (310a, 310b, 310c, and 310d) disposed between adjacent lateral plates (i.e., corner part (310a) is disposed between the first lateral plate (314-1) and the fourth lateral plate (314-4)). The second surface (374-2) of the first to fourth coupling units (374a1, 374a2, 374a3, 374a4) can respectively correspond to the corner parts (310a, 310b, 310c, 310d). The second surface (374-2) of each coupling unit (374) can be spaced apart from its corresponding corner part (310a, 310b, 310c, and 310d) by a gap (g), as seen in FIG. 3 and labeled for exemplary purposes between the second coupling unit (374a2) and the corresponding corner part (310b).

In the exemplary embodiment of the present disclosure, each of the coupling units (374) protruded from the body unit (372) is protruded in the shape of a rectangular pillar, and the magnets (350) arranged in parallel with the lateral plates (314) of the yoke (310) and the rectangular pillar-shaped coupling units (374) are mutually formed at an obtuse angle.

To be more specific, the angle formed by the coupling unit (374) and the magnets (350) may be 135°, for example. Both lateral walls of the coupling unit (374) opposite to each distal end of the adjacent pair of magnets (350) are formed with coupling grooves (375) for being coupled with distal ends of the magnets (350).

In the exemplary embodiment of the present disclosure, the magnet (350) is coupled to the coupling unit (374) by allowing the magnets (350) to be press-fitted into the coupling grooves (375) to a direction facing a bottom surface of the coupling unit (374) from an upper surface of the coupling unit (374).

In the exemplary embodiment of the present disclosure, the press-fitting method may be categorized into three types based on dimensional relationship of the coupling grooves (375) and the magnets (350), that is, a forced press-fitting method where there is no gap between the coupling groove (375) and the magnet (350), a middle press-fitting method where there is a gap or no gap between the coupling groove (375) and the magnet (350), and a loose press-fitting method where there is always a gap between the coupling groove (375) and the magnet (350). In the exemplary embodiment of the present disclosure, all the structural methods may be included capable of inhibiting vertical or horizontal movement of the magnet within a predetermined range.

In the exemplary embodiment of the present disclosure, as the magnets (350) are coupled to the coupling groove (375) to a direction from the upper surface of the coupling unit (374) to a bottom surface of the coupling unit (374), the magnets (350) can be secured to a predetermined position without moving to a direction facing the coil block (19) even if there is a strong shock or vibration from outside.

In the exemplary embodiment of the present disclosure, the body unit (372) and the coupling unit (374) of the housing (370) fixing the magnet (350) include a synthetic resin capable of injection molding, where the body unit (372) and the coupling unit (374) are integrally formed by the injection molding.

Although the exemplary embodiment of the present disclosure has explained that the housing (370) can be formed by the injection molding of synthetic resin, the housing (370) can be alternatively formed by press work of a light metal.

Although the magnet (350) secured to the housing (370) has a structure of easily being disengaged to the upper surface of the coupling unit (374), the magnet (350) secured to the housing (370) is brought into contact with the spacer (700) of FIG. 1, and the spacer (700) inhibits the magnet (350) from being disengaged from the housing (370), whereby the magnet (350) becomes vertically fixed.

Meanwhile, the housing (370) may be simply contacted to the inner lateral surface of the upper plate (312) of yoke (310), an adhesive (378) may be arranged between the housing (370) and the inner lateral surface of the upper plate (312) of yoke (310) in order to inhibit the housing (370) from moving inside the yoke (310). Alternatively, it should be apparent that a concave groove for inserting the body unit (372) may be formed at the upper plate (312) contacted by the body unit (372) of the housing (370) in order to securing the housing (370) to the upper plate (312) of the yoke (310).

Figure 5:
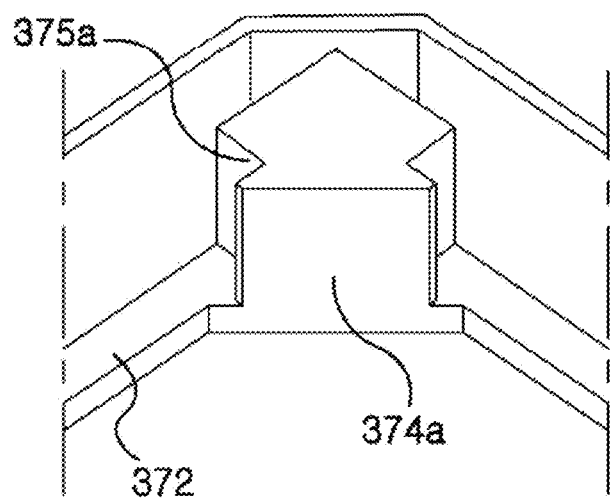
FIG. 5 is a perspective view illustrating a housing of a stator of a VCM according to another exemplary embodiment of the present disclosure.

FIG. 5 is a perspective view illustrating a housing of a stator of a VCM according to another exemplary embodiment of the present disclosure.

The VCM illustrated in FIG. 5 has the substantially same structure as that of FIGS. 1 to 4 except for the coupling unit of the housing, such that like reference numerals refer to like elements throughout, and explanations that duplicate one another will be omitted.

Referring to FIG. 5, the housing (370) includes a body unit (372) and a coupling unit (374a). The coupling unit (374a) is protruded from the body unit (372) along the lateral plate (314) of the yoke (310) and takes the shape of a triangular pillar. Two lateral surfaces of the coupling unit (374a) having the triangular pillar shape are arranged parallel with an adjacent pair of lateral plates (314) and formed with coupling grooves (375a) to be coupled to the magnets (350) in the press-fitting method.

Figure 6:
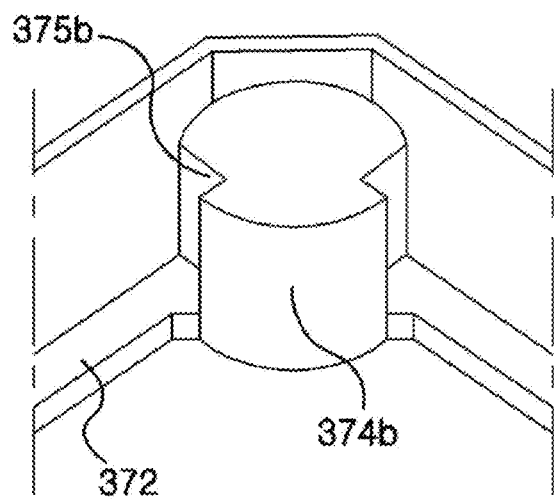
FIG. 6 is a perspective view illustrating a housing of a stator of a VCM according to still another exemplary embodiment of the present disclosure.

FIG. 6 is a perspective view illustrating a housing of a stator of a VCM according to still another exemplary embodiment of the present disclosure.

The VCM illustrated in FIG. 6 has the substantially same structure as that of FIGS. 1 to 4 except for the coupling unit of the housing, such that like reference numerals refer to like elements throughout, and explanations that duplicate one another will be omitted.

Referring to FIG. 6, the housing (370) includes a body unit (372) and a coupling unit (374b). The coupling unit (374b) is protruded from the body unit (372) along the lateral plate (314) of the yoke (310) and takes the shape of a circular cylinder. A periphery of the coupling unit (374b) having the circular cylinder shape is arranged with a coupling groove (375b) to be coupled to the magnets (350) in the press-fitting method.

Figure 7:
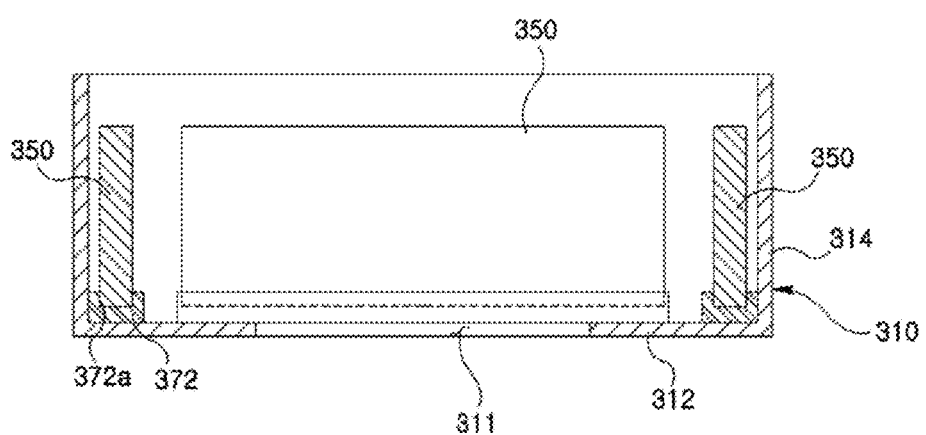
FIG. 7 is a cross-sectional view illustrating a stator of a VCM according to still another exemplary embodiment of the present disclosure.

FIG. 7 is a cross-sectional view illustrating a stator of a VCM according to still another exemplary embodiment of the present disclosure.

The VCM illustrated in FIG. 7 has the substantially same structure as that of FIGS. 1 to 4 except for the coupling unit of the housing, such that like reference numerals refer to like elements throughout, and explanations that duplicate one another will be omitted.

Referring to FIG. 7, the housing (370) includes a body unit (372) and a magnet insertion groove (372a).

In the exemplary embodiment of the present disclosure, the body unit (372) takes the shape of a square frame that is brought into contact with an inner lateral surface of the upper plate (312) of yoke (310), and is formed at an upper surface opposite to the inner lateral surface of the upper plate (312) of yoke (310) with the magnet insertion groove (372a) adequate enough to accommodate the magnet (350). Depth of the magnet insertion groove (372a) is preferably formed with a depth deep enough to inhibit the magnet (350) from being disengaged from the body unit (372).

In the exemplary embodiment of the present disclosure, the body unit (372) is formed with the magnet insertion groove (372a) into which the magnet (350) is inserted, whereby the magnet (350) can be securely fixed to the body unit (372) without forming a coupling unit that is coupled to the magnet (350).

Although the exemplary embodiment of the present disclosure has illustrated and explained that the magnet (350) is coupled via press-fitting method to the injection-molded frame in the yoke (310), it should be apparent that a part of the upper plate of the yoke is cut out and bent to form a housing for securing the magnet (350) to the upper plate (312) of the yoke and the housing is coupled to the magnet (350).

Referring to FIG. 1 again, the case (400) includes an upper case (410) and a bottom case (420). The case (400) serves to mutually couple and fix the rotor (100), the elastic member (200) and the stator (300). The upper case (410) includes an upper plate (411) and a coupling pillar (412). The upper case (310) is arranged on an upper surface of the yoke (310), and the second elastic member (220) in the elastic member (200) is interposed between the upper case (410) and the yoke (310).

The upper plate (411) of the upper case (310) takes the shape of a square plate when viewed from a top plan view, and is centrally formed with an opening (414) for exposing the bobbin (150).

The coupling pillar (412) of the upper case (410) is protruded in parallel with the bobbin (150) from the four corners of the upper plate (411), and is coupled to the bottom case (420, described later). The bottom case (420) includes pillars (424) coupled to each coupling pillar (412) of the upper case (410).

As noted from the foregoing, there is an advantageous effect in that the driving efficiency reduction and driving imperfection of the rotor generated by movement of magnet inside the yoke can be inhibited by coupling the magnet arranged inside the yoke using the housing via press-fitting method.

Now, another exemplary embodiment of the present disclosure will be described with reference to the accompanying drawings.

In the drawings, the width, length, thickness, etc. of components may be exaggerated or reduced for the sake of convenience. Furthermore, throughout the descriptions, the same reference numerals will be assigned to the same elements in the explanations of the figures, and explanations that duplicate one another will be omitted. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Figure 8:
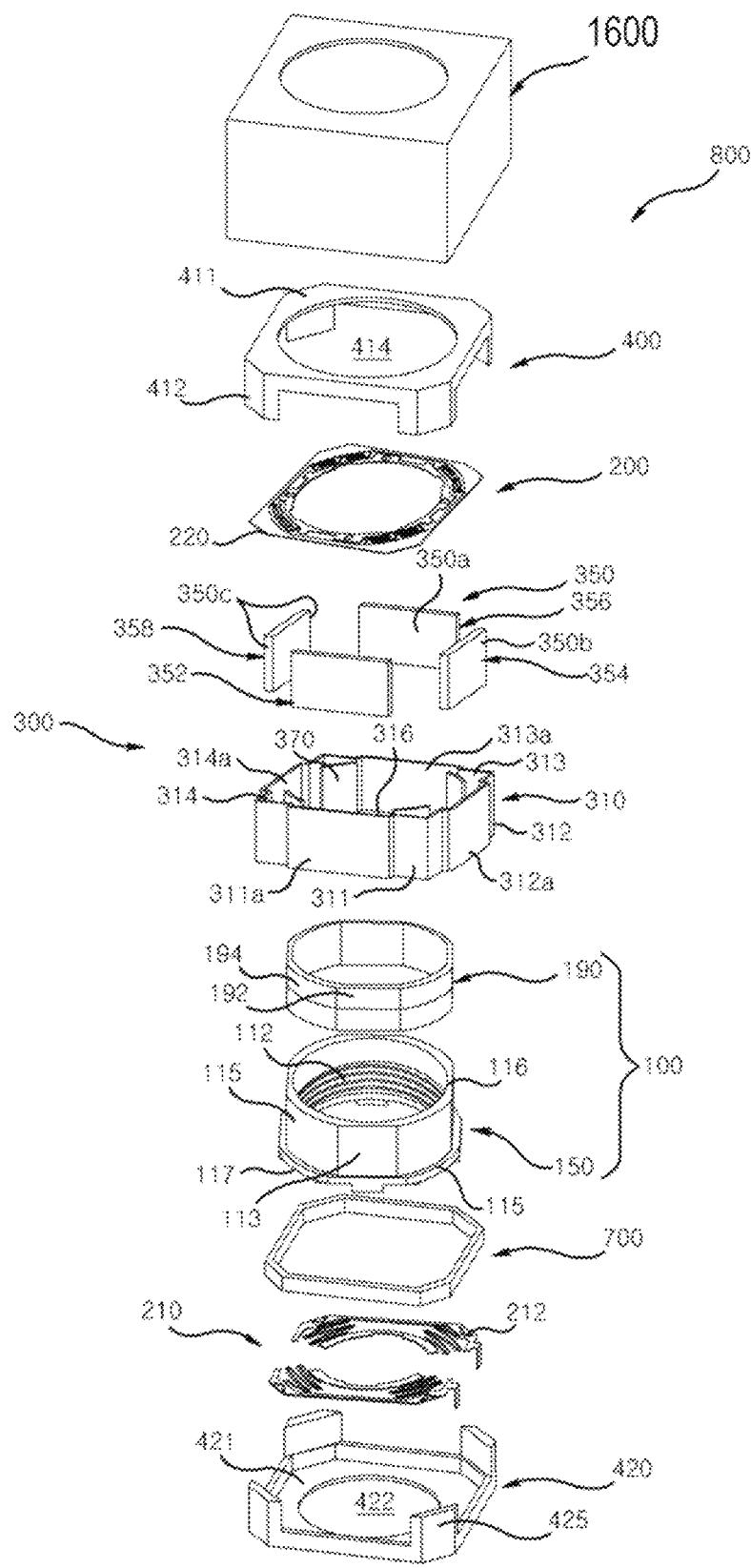
FIG. 8 is an exploded perspective view illustrating a VCM according to an exemplary embodiment of the present disclosure.
Figure 9:
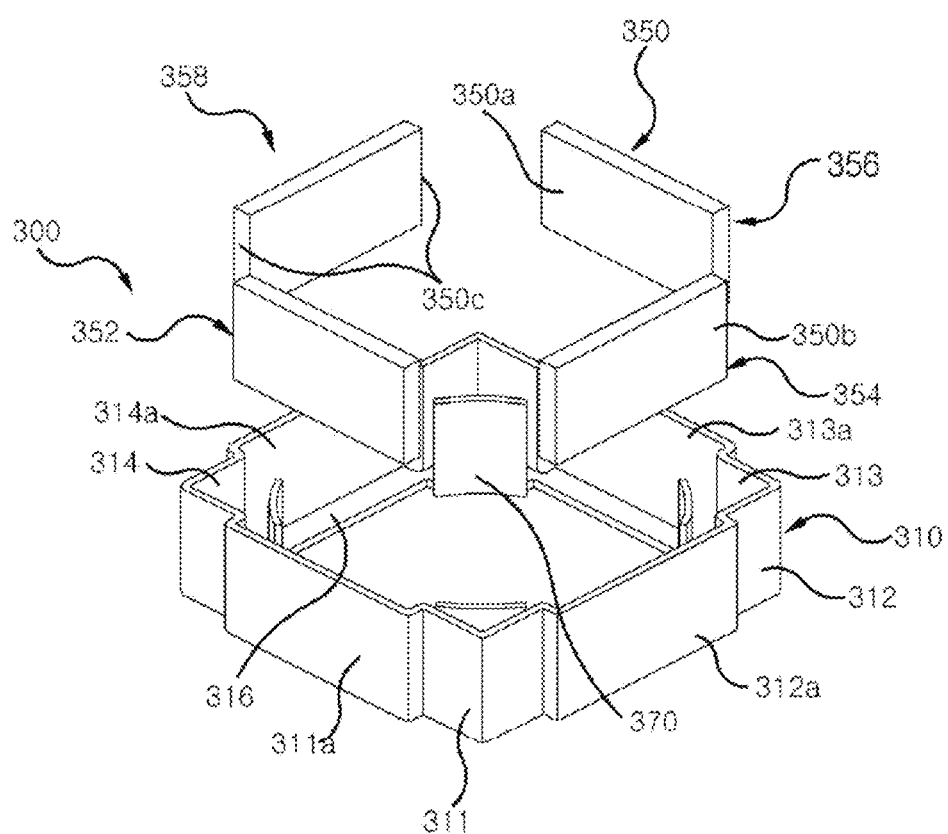
FIG. 9 is an exploded perspective view of magnet and bobbin of stator of FIG. 8.
Figure 10:
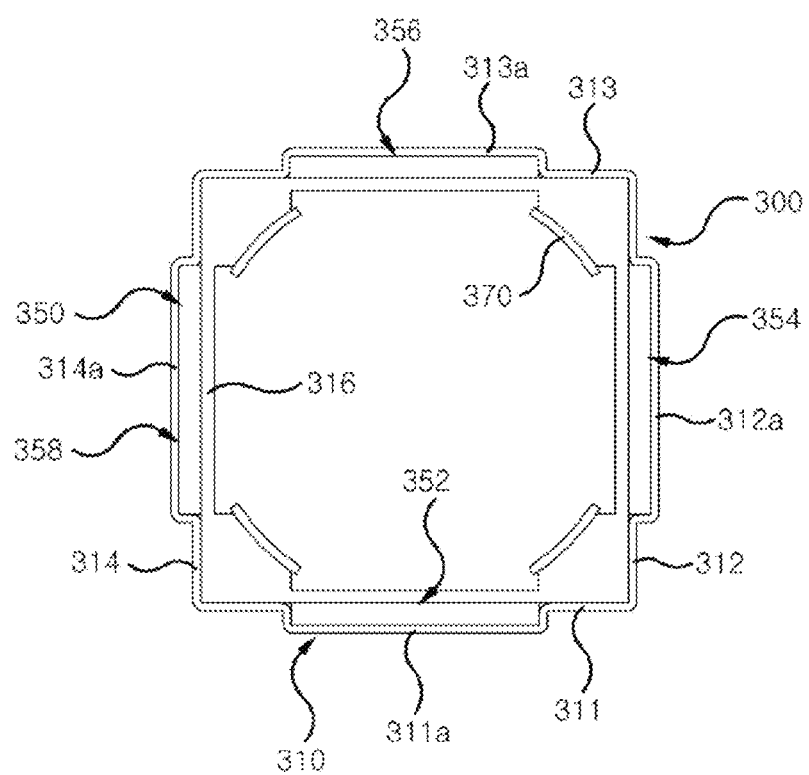
FIG. 10 is a plan view of FIG. 9.

FIG. 8 is an exploded perspective view illustrating a VCM according to an exemplary embodiment of the present disclosure, FIG. 9 is an exploded perspective view of magnet and bobbin of stator of FIG. 8, and FIG. 10 is a plan view of FIG. 9.

Referring to FIG. 8, a VCM (800) includes a rotor (100), an elastic member (200) and a stator (300). The VCM (800) may further include an upper spacer (400), a cover can (1600) and a base (420).

The rotor (100) includes a bobbin (150) and a coil block (190). The bobbin (150) takes the shape of both ends-opened barrel. The bobbin may take the shape of both ends-opened cylinder, for example. The bobbin serves to secure a lens opposite to an image sensor changing an outside light to an image.

An inner surface of the bobbin (150) is formed with a female screw unit (112) for accommodating the lens to the bobbin (150), and the female screw unit (112) may be formed with a lens fixing member (not shown) coupled to the lens.

Alternatively, it should be also appreciated that the lens is directly coupled to the female screw unit of the bobbin (150). A peripheral bottom distal end of the bobbin (150) is formed with a hitching sill (115) for supporting a coil block (190, described later).

The coil block (190) is arranged at a periphery of the bobbin (150), and secured by using the hitching sill (118) formed at the peripheral bottom of the bobbin (150).

The coil block (190) may be formed by winding a coil on the periphery of the bobbin (150) in the shape of a cylinder, or by inserting a cylindrically wound coil block (190) to the periphery of the bobbin (150). In a case the coil block (190) is formed by inserting a cylindrically wound coil block (190) to the periphery of the bobbin (150), an adhesive may be interposed between the coil block (190) and the bobbin (150).

The coil block (190) is electrically connected to first elastic members (210) of elastic member (200, described later). The rotor (100) is driven relative to a magnet (350) by a force generated by a magnetic field of the coil block (190) and a magnetic field of the magnet (350, described later).

In the exemplary embodiment of the present disclosure, a gap between a lens mounted on the bobbin (150) and an image sensor (not shown) opposite to the lens can be accurately adjusted by adjusting a level of a driving signal applied to the coil block (190).

The elastic member (200) includes a first elastic member (210) and a second elastic member (220). In the exemplary embodiment of the present disclosure, each of the first elastic member (210) and the second elastic member (220) may include a leaf spring.

The first elastic member (210) and the second elastic member (220) according to the exemplary embodiment of the present disclosure serve to elastically support the bobbin (150), inhibit the bobbin (150) from being disengaged from a predetermined position, and return the bobbin (150) lifted by the coil block (190) and the magnet (350) to an initial position.

The first elastic member (210) is coupled to a bottom surface (117) of the bobbin (150). The first elastic member (210) is coupled to a boss (not shown) protruded from the bottom surface (117) of the bobbin (150). The first elastic member (210) includes a through hole coupled to the boss protruded from the bottom surface (117) of the bobbin (150).

A distal end of the boss is applied with heat and pressure after the first elastic member (210) is inserted into the boss protruded from the bottom surface (117) of the bobbin (150). An upper surface of the first elastic member (210) is secured to the boss by the distal end of the boss fused by the heat and pressure applied to the boss, whereby the first elastic member (210) is inhibited from being disengaged from the bottom surface (117) of the bobbin (150).

The first elastic member (210) may be formed in a pair according to the exemplary embodiment of the present disclosure, and the pair of first elastic members (210) is mutually electrically insulated therebetween, and the electrically insulated pair of first elastic members (210) includes a connection terminal which is in turn electrically connected to an outside circuit substrate.

One distal end of the coil forming the coil block (190) and the other distal end facing the one distal end of the coil are electrically connected to the pair of first elastic members (210). As a result, the driving signal provided from the outside circuit substrate is provided to the coil block (190) through the first elastic members (210), and a magnetic field is generated from the coil block (190) by the driving signal.

The second elastic member (220) is coupled to an upper surface (116) opposite to the bottom surface (117) of the bobbin (150).

Referring to FIGS. 9 and 10, the stator (300) includes a yoke (310) and a magnet (350). In the exemplary embodiment of the present disclosure, the magnet (350) includes four magnets, for example. Hereinafter, the four magnets (350) are defined as a first magnet (352), a second magnet (354), a third magnet (356) and a fourth magnet (358).

The first, second, third and fourth magnets (352, 354, 356, 358) are arranged about the coil block (190), where the first magnet (352) is arranged opposite to the third magnet (356), and the second magnet (354) is arranged opposite to the fourth magnet (358). The first, second, third and fourth magnets (352, 354, 356, 358) are mutually and vertically arranged.

In the exemplary embodiment of the present disclosure, each of the first, second, third and fourth magnets (352, 354, 356, 358) includes an inner lateral surface (350a) facing the coil block (190), an outer lateral surface (350b) opposite to the inner lateral surface (350a), and a lateral surface (350c) connecting the inner and outer lateral surfaces (350a, 350b).

The yoke (310) includes lateral plates (311, 312, 313, 314), and the number of the lateral plates (311, 312, 313, 314) is formed corresponding to that of the magnet (350). The yoke (310) includes a metal material and improves a driving efficiency of the rotor (100) by inhibiting the magnetic flux generated by the magnet (350, described later) from leaking and by inducing the magnetic flux generated by the magnet (350) to face the coil block (190).

In the exemplary embodiment of the present disclosure, the yoke (310) is also formed with four lateral plates (311, 312, 313, 314), because the coil block (190) is arranged thereabout with the first, second, third and fourth magnets (352, 354, 356, 358).

In the exemplary embodiment of the present disclosure, the yoke (310) may take the shape of a square frame when viewed in a top plane view.

Hereinafter, the four lateral plates (311, 312, 313, 314) of the yoke (310) are respectively defined as a first lateral plate (311), a second lateral plate (312), a third lateral plate (313) and a fourth lateral plate (314).

The first lateral plate (311) is arranged at a position corresponding to the first magnet (352), the second lateral plate (312) is arranged at a position corresponding to the second magnet (354), the third lateral plate (313) is arranged at a position corresponding to the third magnet (356) and the fourth lateral plate (314) is arranged at a position corresponding to the fourth magnet (358).

An external surface (350b) of the first magnet (352) is arranged opposite to an inner lateral surface of the first lateral plate (311), an external surface (350b) of the second magnet (354) is arranged opposite to an inner lateral surface of the second lateral plate (312), an external surface (350b) of the third magnet (356) is arranged opposite to an inner lateral surface of the third lateral plate (313) and an external surface (350b) of the fourth magnet (358) is arranged opposite to an inner lateral surface of the fourth lateral plate (314).

The first lateral plate (311) is formed with a first pocket unit (311a) in order to secure the first magnet (352) to a predetermined position of the first lateral plate (311). The first pocket unit (311a) fixes the external surface (350b) and lateral surfaces (350c) of the first magnet (352). The first pocket unit (311a) is formed by protruding a part of the first lateral plate (311) from an inner lateral surface toward the external surface, where the first magnet (352) is inserted into the first pocket unit (311a). For example, the first magnet (352) may be press-fitted into the first pocket unit (311a). Alternatively, an adhesive may be interposed between the first magnet (352) and the first pocket unit (311a) in order to securely fix the first magnet (352) to the first pocket unit (311a).

In the exemplary embodiment of the present disclosure, the press-fitting method may be categorized into three types based on dimensional relationship of the first, second, third and fourth magnets (352, 354, 356, 358) and first, second, third and fourth pocket units (311a, 312a, 313a, 314a), that is, a forced press-fitting method where there is no gap, a middle press-fitting method where there is a gap or no gap, and a loose press-fitting method where there is always a gap. In the exemplary embodiment of the present disclosure, all the structural methods may be included capable of inhibiting vertical or horizontal movement of the first, second, third and fourth magnets (352, 354, 356, 358) within a predetermined range.

The second pocket unit (312a) is formed at the second lateral plate (312) in order to fix the second magnet (354) to a predetermined position of the second lateral plate (312). The second pocket unit (312a) fixes the external surface (350b) and lateral surface (350c) of the second magnet (354). The second pocket unit (312a) is formed by protruding a part of the second lateral plate (312) from an inner lateral surface to the external surface. For example, the second magnet (354) may be press-fitted into second pocket unit (312a). Alternatively, an adhesive may be interposed between the second magnet (354) and the second pocket unit (312a) in order to securely fix the second magnet (354) to the second pocket unit (312a).

The third pocket unit (313a) is formed at the third lateral plate (313) in order to fix the third magnet (356) to a predetermined position of the third lateral plate (313). The third pocket unit (313a) fixes the external surface (350b) and lateral surface (350c) of the third magnet (356).

The third pocket unit (313a) is formed by protruding a part of the third lateral plate (313) from an inner lateral surface to the external surface. For example, the third magnet (356) may be press-fitted into third pocket unit (313a). Alternatively, an adhesive may be interposed between the third magnet (356) and the third pocket unit (313a) in order to securely fix the third magnet (356) to the third pocket unit (313a).

The fourth pocket unit (314a) is formed at the fourth lateral plate (314) in order to fix the fourth magnet (358) to a predetermined position of the fourth lateral plate (314). The fourth pocket unit (314a) fixes the external surface (350b) and lateral surface (350c) of the fourth magnet (358). The fourth pocket unit (314a) is formed by protruding a part of the fourth lateral plate (314) from an inner lateral surface to the external surface. For example, the fourth magnet (358)

may be press-fitted into fourth pocket unit (314a). Alternatively, an adhesive may be interposed between the fourth magnet (358) and the fourth pocket unit (314a) in order to securely fix the fourth magnet (358) to the fourth pocket unit (314a).

In the exemplary embodiment of the present disclosure, the magnet (350) can be inhibited from being disengaged from the yoke (310) by external shock or vibration by arranging the first, second, third and fourth pocket units (311a, 312a, 313a, 314a) on the first, second, third and four lateral plates (311, 312, 313, 314) of the yoke (310).

Furthermore, because positions of the first, second, third and fourth magnets (352, 354, 356, 358) are determined by the first, second, third and fourth pocket units (311a, 312a, 313a, 314a) formed at the first, second, third and fourth lateral plates (311, 312, 313, 314), the positions of the first, second, third and fourth magnets (352, 354, 356, 358) are inhibited from being changed or being arranged at positioned deviated from designated positions.

A magnet support unit (316) may be formed by extending or bending a bottom end of the first, second, third and fourth lateral plates (311, 312, 313, 314) toward the bottom surface of the first, second, third and fourth magnets (352, 354, 356, 358).

Meanwhile, in order for the first, second, third and fourth magnets (352, 354, 356, 358) from being disengaged from an upper surface opposite to the bottom surface of the first, second, third and fourth pocket units (311a, 312a, 313a, 314a), the yoke (310) may include an additional magnet support unit extended from the first, second, third and fourth pocket units (311a, 312a, 313a, 314a) to the upper surface of the first, second, third and fourth magnets (352, 354, 356, 358).

Meantime, referring to FIGS. 9 and 10, the yoke (310) included in the stator (300) may include a curvature yoke plate (370) arranged in parallel with the coil block (190) from a portion corresponding to the magnets (350) to inhibit the magnetic field generated by the coil block (190) from leaking.

Each magnet (350) fixed by the yoke (310) generates a magnetic field, and the rotor (100) is driven by a repulsive force generated by the magnetic field generated by the magnets (350) and the magnetic field generated by the coil block (19) facing the magnets (350).

Referring to FIG. 8 again, the upper spacer (400) includes an upper plate (411) and a coupling pillar (412). The upper spacer (400) is arranged on the magnet support unit (316), and the second elastic member (220) of the second elastic member (200) is interposed between the upper spacer (400) and the yoke (310).

The upper plate (411) of the upper spacer (400) takes the shape of a square plate when viewed in a top plane view, and is centrally formed with an opening (414) for exposing the bobbin (150). The coupling pillar (412) of the upper spacer (400) is protruded in parallel with the bobbin (150) from four corners of the upper plate (411), and the coupling pillar (412) is coupled to the base (420, described later). The base (420) includes pillars (425) coupled to the each coupling pillar (412) of upper spacer (400).

Figure 11:
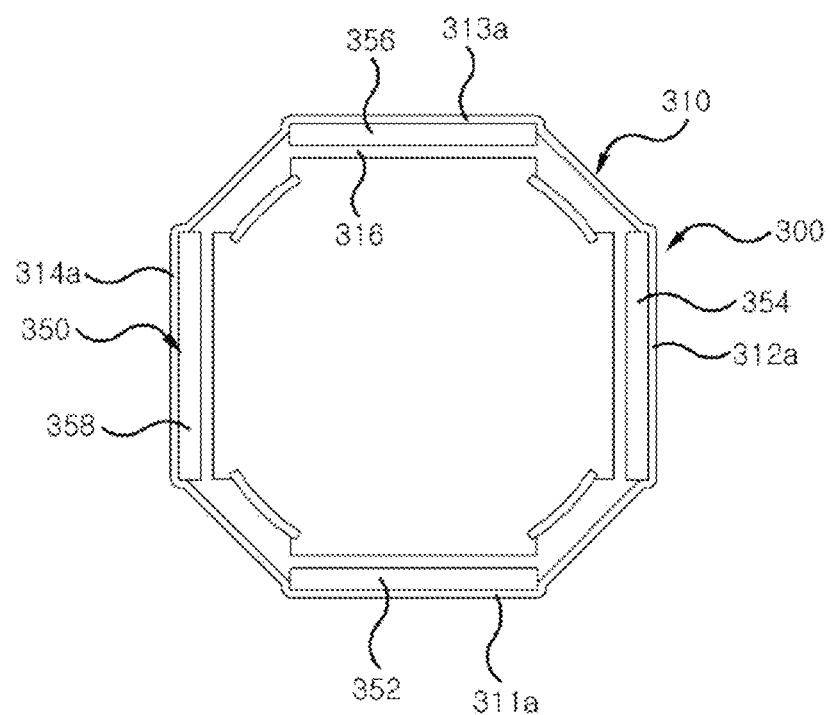
FIG. 11 is a plan view of a yoke and a magnet of VCM according to another exemplary embodiment of the present disclosure.

FIG. 11 is a plan view of a yoke and a magnet of VCM according to another exemplary embodiment of the present disclosure.

The VCM illustrated in FIG. 11 has the substantially same structure as that of FIGS. 8 to 10 except for the yoke, such that like reference numerals refer to like elements throughout, and explanations that duplicate one another will be omitted.

Referring to FIG. 11, the yoke (310) takes the shape of an pentagonal frame, and mutually facing four lateral plates among eight lateral surfaces of the yoke (310) are respectively defined as first, second, third and fourth pocket units (311a, 312a, 313a, 314a), and the first, second, third and fourth pocket units (311a, 312a, 313a, 314a) are fixed with the first, second, third and fourth magnets (352, 354, 356, 358).

Figure 12:
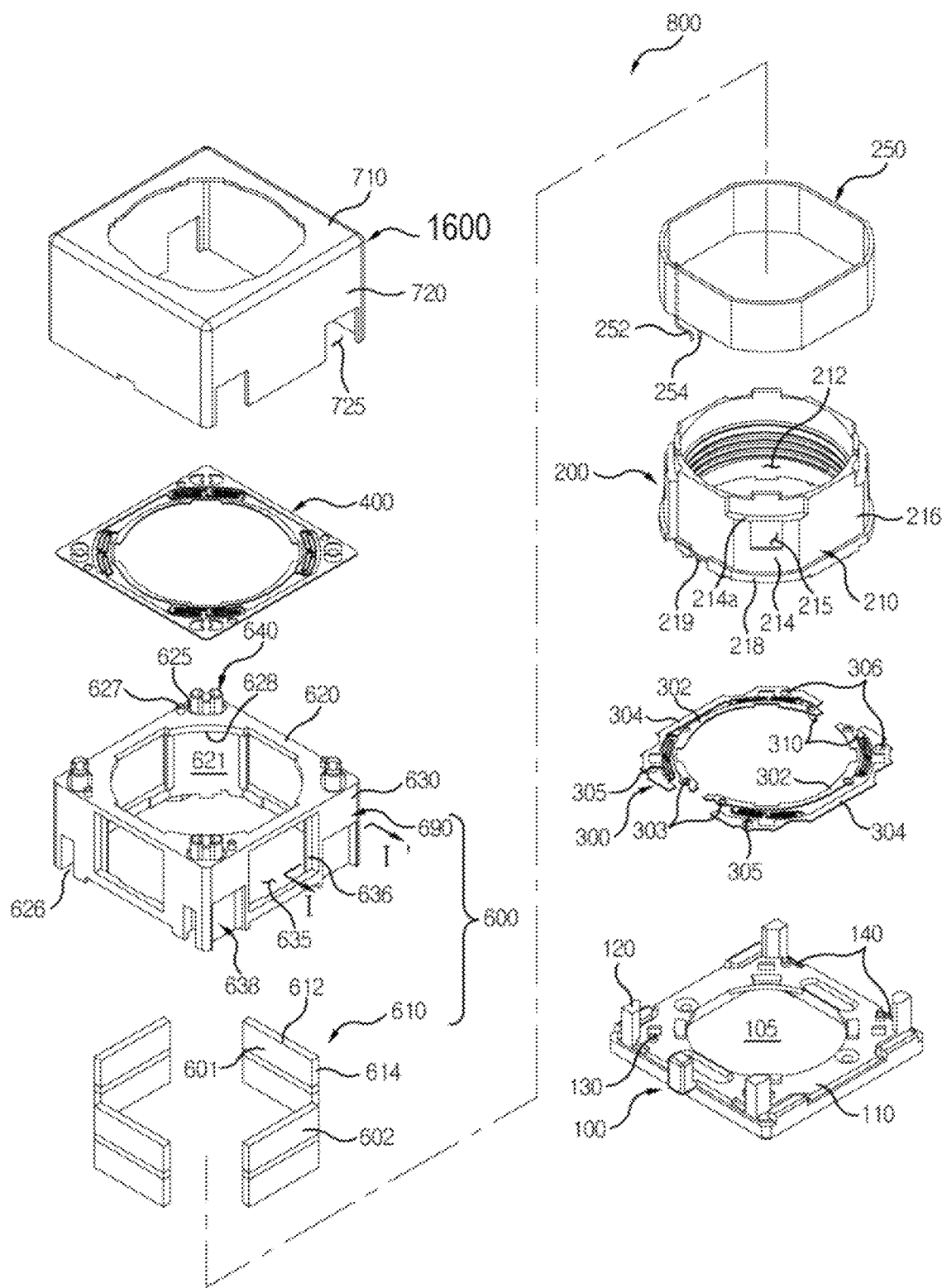
FIG. 12 is an exploded perspective view of a VCM according to an exemplary embodiment of the present disclosure.
Figure 13:
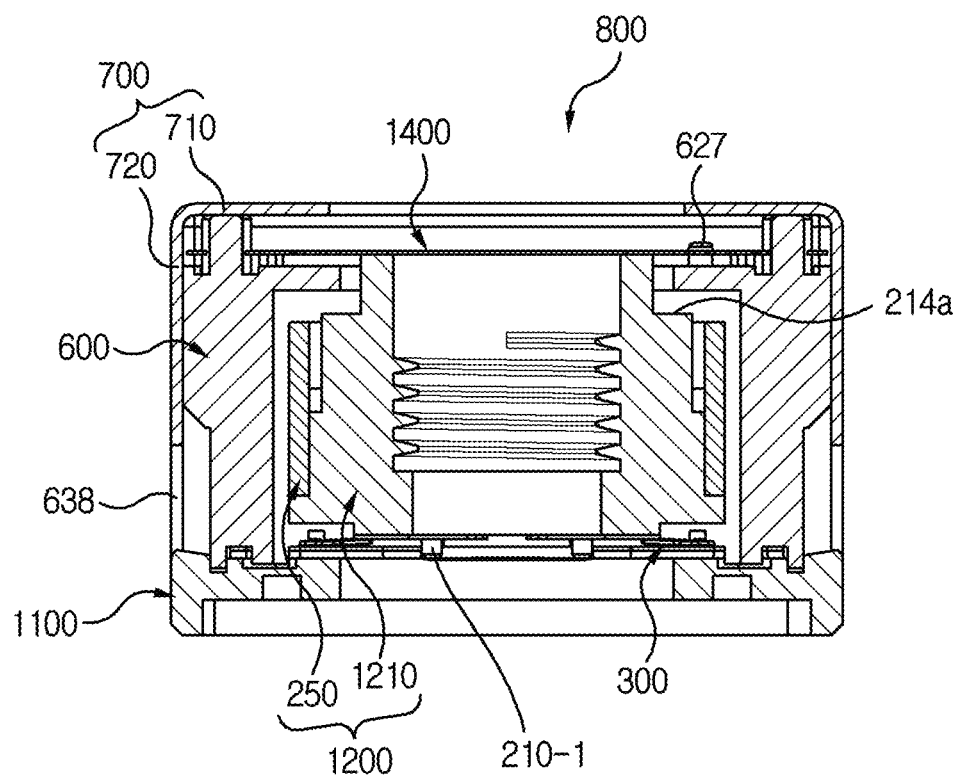
FIG. 13 is an assembled cross-sectional view of FIG. 12.

As apparent from foregoing, there is an advantageous effect in that a magnet can be inhibited from moving inside a yoke by forming a pocket unit at the yoke and fixing the magnet at the pocket unit, the magnet can be inhibited from being disengaged from the yoke by outside shock, the magnet can be secured at a predetermined position and the magnet can be arranged inside the yoke by automatic facility FIG. 12 is an exploded perspective view of a VCM according to an exemplary embodiment of the present disclosure, and FIG. 13 is an assembled cross-sectional view of FIG. 12.

Referring to FIGS. 12 and 13, a VCM (800) includes a rotor (1200), elastic members (300, 1400) and a stator (600). The VCM (800) may further include a base (1100) and a cover can (1600).

The rotor (12100) includes a bobbin (1210) and a coil block (250). The bobbin (1210) takes the shape of a hollow hole-formed cylinder and is mounted therein with a lens (not shown). The bobbin is alternatively formed at a periphery with a curvature unit (214) and a planar unit (216). In the exemplary embodiment of the present disclosure, four curvature units (214) and planar units (216) are respectively alternatively formed.

The curvature unit (214) formed at the periphery of the bobbin (1210) is formed with a bond tank (215) for fixing a coil block (250, described later), and the bond tank (215) takes the shape of a recess concaved from the curvature unit (214).

Although the exemplary embodiment of the present disclosure illustrated and explained the bond tank (215) formed at the curvature unit (214), it should be apparent that the bond tank (215) may be formed at the planar unit (216).

Meantime, part of an upper end of each curvature unit (214) formed at the periphery of the bobbin (1210) is cut out to allow the curvature unit (214) of the bobbin (1210) to be formed with a stair-cased hitching sill (214a), and the bond tank (215) is linked to the hitching sill (214a).

A support unit (218) is formed at a bottom end of the periphery of the bobbin (1210) for supporting the coil block (250, described later), and is protruded along the peripheral bottom end of the bobbin (1210) in the shape of a rib. The support unit (218) may include a partially cut-out unit (219) through which both ends of the coil block (250, described later) can pass.

The coil block (250) included in the rotor (1200) takes the shape of a cylinder, and is formed by winding an insulation resin-coated wire such as enamel resin in the shape of a cylinder. The coil block (250) may be directly wound on the periphery of the bobbin (1210). The coil block (250) formed on the periphery of bobbin (1210) is bonded to the bobbin (1210) via an adhesive provided to the bond tank (215). Both ends (252, 254) of the coil block (250) arranged on the periphery of the bobbin (1210) are protruded to a bottom surface of the bobbin (1210) through the cut-out unit (219) of the support unit (218) formed at the bobbin (1210).

The both ends (252, 254) of the coil block (250) protruded to the bottom surface of the bobbin (1210) through the cut-out unit (219) of the support unit (218) formed at the bobbin (1210) are electrically connected to a first elastic member (300) among the elastic members (300, 400, described later). The elastic members (300, 1400) include a first elastic member (300) and a second elastic member (1400).

The first elastic member (300) is coupled to the bottom surface of the bobbin (12100), and the second elastic member (1400) is arranged on an upper surface of the bobbin (1210). A pair of first elastic members (300) is arranged on the bottom surface of the bobbin (1210), and the pair of first elastic members (300) serves to support the bottom surface of the bobbin (1210). Each of the pair of first elastic members (300) arranged at the bottom surface of the bobbin (1210) is electrically isolated from the other, such that each of the pair of first elastic members (300) is not mutually contacted.

Each of the pair of first elastic members (300) coupled to the bottom surface of bobbin (1210) may be formed by etching process or press work of a conductive metal plate. Each of the pair of first elastic members (300) is symmetrically formed about the bobbin (1210). Each of the pair of first elastic members (300) includes an inner elastic unit (302), an external elastic unit (304) and a connection elastic unit (306).

Each inner elastic unit (302) takes the shape of a semi-circular plate when viewed in a top plane view, and is formed with a through hole (303) coupled to a boss (210-1) formed at the bottom surface of the bobbin (1210). Each inner elastic unit (302) is fixed at the bottom surface of the bobbin (1210).

Each inner elastic unit (302) is electrically connected to both ends (252, 254) of the coil block (250). For example, each inner elastic unit (302) is electrically connected to both ends (252, 254) of the coil block (250) via a solder.

Each of the external elastic units (304) is arranged at a periphery of the inner elastic unit (302) and takes the shape of a semi-circular plate when viewed in a top plan view. Each of the external elastic units (304) is formed with a through hole (305) coupled to the boss (130) formed at an upper surface (110) of the base (1100, described later).

Each of the connection elastic units (306) serves to elastically connect the inner elastic unit (302) and the external elastic units (304), and may take the shape of a zigzag when viewed in a top plan view in order to generate elastic force.

In the exemplary embodiment of the present disclosure, the first elastic member (300) is formed with a terminal unit (310) to be electrically connected to an outside circuit substrate. An electric signal provided to the terminal unit (310) is provided to both ends (252, 254) of the coil block (250) through the pair of first elastic members (310), whereby a magnetic field is generated from the coil block (250).

Meanwhile, an upper surface corresponding to the bottom surface of the bobbin (1210) is such that the second elastic member (1400) may be elastically coupled to the upper surface of the bobbin (1210). The second elastic member (1400) is coupled to a stroke lug formed at a housing of the stator (described later).

Figure 14:
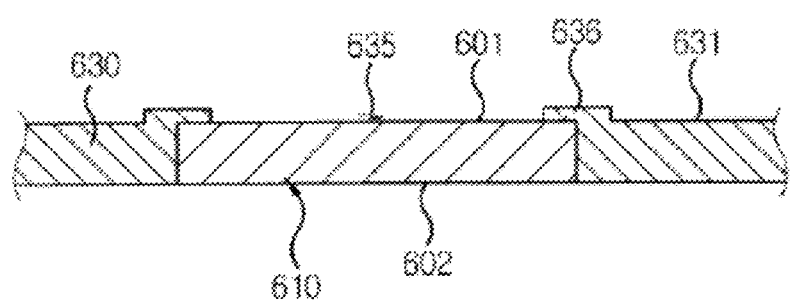
FIG. 14 is a cross-sectional view cut along line I-I' of FIG. 12.

FIG. 14 is a cross-sectional view cut along line I-I' of FIG. 12. Referring to FIGS. 12 and 14, the stator (600) includes a flat magnet (610) and a housing (690). The flat magnet (610) is arranged opposite to the coil block (250) wound on the bobbin (1210), and includes a plurality of magnets.

In the exemplary embodiment of the present disclosure, each of the flat magnets (610) takes the shape of a plate, and four flat magnets (610) are mutually vertically arranged. Each of the flat magnets (610) takes the shape of a cuboidal plate formed with mutually facing long sides (612) and mutually facing short sides (614).

The flat magnet (610) may include a single flat magnet formed with an N pole and an S pole, or a stacked flat magnet in which at least two single magnets each stacked with an N pole and an S pole are stacked. Alternatively, the flat magnet (610) may include a four-pole flat magnet formed with N pole-S pole-N pole-S pole.

In the exemplary embodiment of the present disclosure, a surface of the flat magnet (610) opposite to the coil block (250) is defined as a front surface (601), and a surface opposite to the front surface (601) of the flat magnet (601) is defined as a rear surface (602).

The housing (690) functions to secure the flat magnet (610) whereby the flat magnet (610) faces the coil block (250). In the exemplary embodiment of the present disclosure, the housing (690) may take the shape of a bottom surface-opened cuboidal box. The housing (690) includes a upper plate (620) and a lateral plate (630), and the flat magnet (610) is fixed at each lateral plate (630).

The upper plate (620) of the housing (690) takes the shape of a square plate, for example, and is centrally formed with an opening (621) exposing a lens mounted at the bobbin (1210). The lateral plate (630) of the housing (690) is extended to a direction encompassing the bobbin (1210) from four edges of the upper plate (620), whereby the housing (690) takes the shape of the bottom surface-opened cuboidal box.

Meanwhile, a stopper unit (628) is protruded from an inner lateral surface formed by the opening (621) formed at the upper plate (620), and the stopper unit (628) is formed at a position corresponding to each hitching sill (214a) formed at the curvature unit (214) at the periphery of the bobbin (1210). The stopper unit (628) is brought into contact with the hitching sill (214a) of the bobbin (1210) to restrict a stroke length of the bobbin (1210).

In the exemplary embodiment of the present disclosure, the stopper unit (628) may be formed with a curved surface having a similar or same curvature as that of the periphery of the bobbin (1210), when viewed in a top plan view.

Stroke lugs (640) are protruded from the upper plate (620) of the housing (690). Each of the stroke lugs (640) is formed at each diagonal corner of upper plate (620), and may be formed at each corner of the upper plate (620). The stroke lugs (640) serve to secure a stroke space and to fix the second elastic member (400).

The stroke lug (640) formed at each corner of upper plate (620) is formed in a pair, and the pair of stroke lugs (640) is symmetrically formed about the center of the stroke lug (640).

In the exemplary embodiment of the present disclosure, the pair of stroke lugs (640) may be formed with a shape similar to a semi-circular pillar. Alternatively, the pair of stroke lugs (640) may be formed with various shapes including a square pillar and a polygonal pillar. Although the exemplary embodiment of the present disclosure illustrated and explained that the pair of stroke lugs (640) is symmetrically formed at each corner of upper plate (620) of the housing (690), alternatively, it should be apparent that the pair of stroke lugs (640) may be asymmetrically formed at each corner of upper plate (620) of the housing (690).

Meanwhile, the upper plate (620) of the housing (690) is formed with a bond tank unit (625) along a circumference of the stroke lug (640) in the shape of a trench, and the bond tank unit (625) is provided with an adhesive, and the second elastic member (400) is bonded to the upper plate (620) of the housing (690) via the adhesive. A coupling lug (627) is formed at a position adjacent to the stroke lug (640) of the upper plate (620) at the housing (690).

The coupling lug (627) is coupled to the housing (690) to a direction designated by the second elastic member (400), and each of the diagonally formed coupling lugs (627) formed at the upper plate (620) of the housing (690) is asymmetrically formed based on the center of the upper plate (620) in order to inhibit the second elastic member (400) from being coupled to the housing (690) to a direction not designated by the second elastic member (400).

A center of each lateral plate (630) of the housing (690) is formed with a through hole (635) through which each lateral plate (630) passes, and the flat magnet (610) is coupled to the lateral plate (630) of the housing (690) using an accommodation hole (635).

Figure 15:
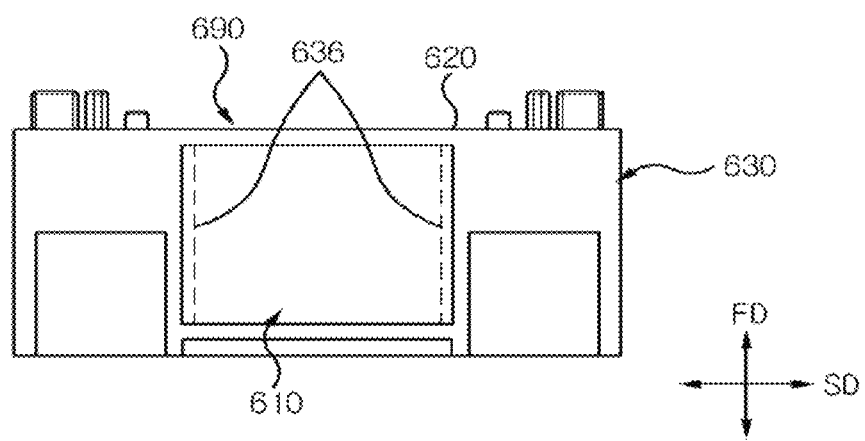
FIG. 15, FIG. 16, and FIG. 17 illustrates front views of lateral plate of FIG. 14.
Figure 16:
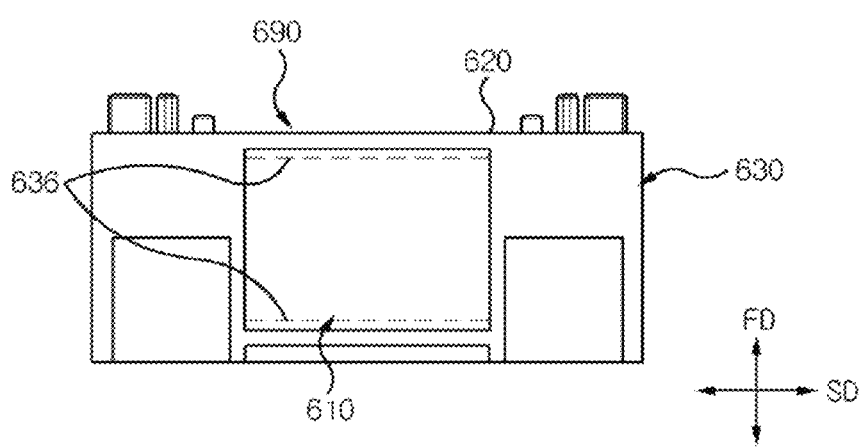
Figure 17:
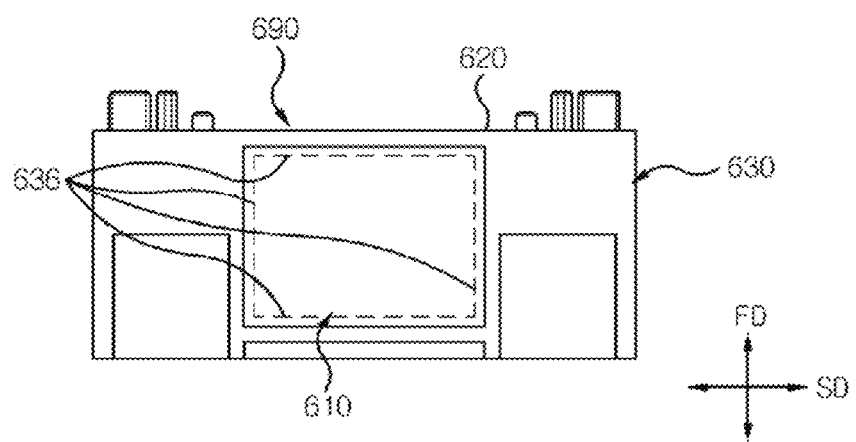

FIG. 15 to FIG. 17 illustrates front views of lateral plate of FIG. 14.

Referring to FIGS. 12, 14 and 15, each lateral plate (630) of the housing (690) includes a disengagement prevention unit (636) to inhibit the flat magnet (610) accommodated in the accommodation hole (635) of each lateral plate (630) from being disengaged to a direction facing the coil block (250).

The disengagement prevention unit (636) inhibits the operation imperfection of the rotor (200) that is generated by the flat magnet (610) that is disengaged to a direction facing the coil block (250) to interfere with the coil block (250).

The disengagement prevention unit (636) is extended from an inner lateral surface (631) of the lateral plate (630) into the accommodation hole (635), and is formed with a thickness thin enough not to interfere with the coil block (250). The disengagement prevention unit (636) is brought into contact with both edges of the front surface (601) of the flat magnet (610), for example. To this end, the disengagement prevention unit (636) is protruded from the inner lateral surface (631) of the lateral plate (630) toward both edges of the front surface (601) of the flat magnet (610).

In the exemplary embodiment of the present disclosure, in a case the disengagement prevention unit (636) is extended from an inner lateral surface (631) of the lateral plate (630) into the accommodation hole (635), the thickness of the flat magnet (610) is not affected by thickness of the disengagement prevention unit (636), such that the thickness of the flat magnet (610) can be formed with the substantially same thickness of the lateral plate (630). In the exemplary embodiment of the present disclosure, an external surface of the lateral plate (630) is arranged on the same planar surface as that of the rear surface (602) of the flat magnet (610).

As illustrated in FIG. 15, it should be apparent that the disengagement prevention unit (636) is formed in parallel with the upper plate (620) of the housing (690), formed in parallel with the long side (612) of the flat magnet (610) and formed to a second direction (SD) perpendicular to a first direction (FD).

As illustrated in FIG. 17, it should be apparent that the disengagement prevention unit (636) is parallel with an axial direction of the bobbin (250), parallel with the first direction (FD) parallel with the short side (614) of the flat magnet (610) and the upper plate (620) of the housing (690), and parallel with the long side (612) of the flat magnet (610) and the second direction (SD) perpendicular to the first direction (FD).

Figure 18:
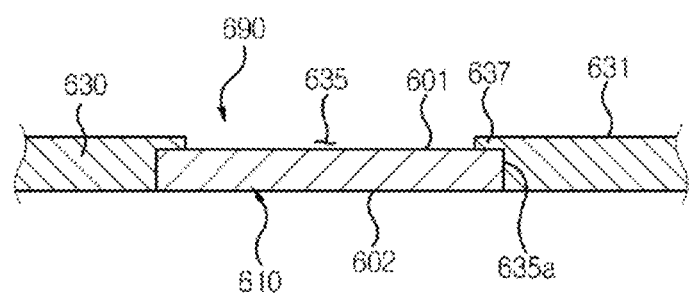
FIG. 18 is a cross-sectional view of a disengagement prevention unit of a housing according to an exemplary embodiment of the present disclosure.

FIG. 18 is a cross-sectional view of a disengagement prevention unit of a housing according to an exemplary embodiment of the present disclosure.

Referring to FIG. 18, a disengagement prevention unit (637) formed at the lateral plate (630) of the housing (690) is protruded from an accommodation surface (635*a*) formed by the accommodation hole (635) penetrating each lateral plate (630), and the disengagement prevention unit (637) is thinner than the lateral plate (630) to support both edges of the front surface (601) of the flat magnet (610).

The thickness of each flat magnet (610) is formed with a thickness minus the thickness of the disengagement prevention unit (637) from the thickness of the lateral plate (630). Furthermore, in the exemplary embodiment of the present disclosure, an external surface of the lateral plate (630) is arranged in the same planar surface as that of the rear surface (602) of the flat magnet (610).

Figure 19:
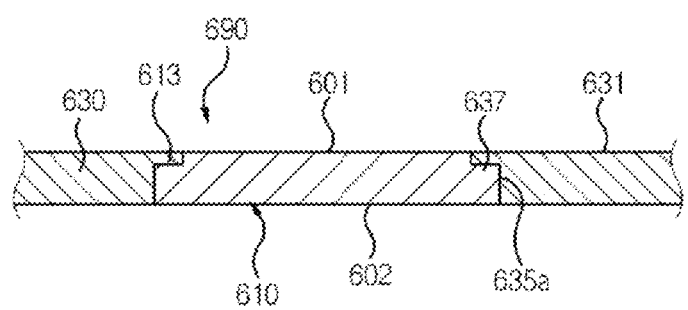
FIG. 19 a cross-sectional view of a disengagement prevention unit of a housing according to another exemplary embodiment of the present disclosure.

FIG. 19 a cross-sectional view of a disengagement prevention unit of a housing according to another exemplary embodiment of the present disclosure.

Referring to FIG. 19, the disengagement prevention unit (637) formed at the lateral plate (630) of the housing (690) is protruded from an accommodation surface (635*a*) formed by the accommodation hole (635) penetrating each lateral plate (630), and the disengagement prevention unit (637) is thinner than the lateral plate (630).

In a case the disengagement prevention unit (637) formed at the lateral plate (630) of the housing (690) is protruded from an accommodation surface (635*a*) formed by the accommodation hole (635), the thickness of the flat magnet (610) is affected by the disengagement prevention unit (637).

In the exemplary embodiment of the present disclosure, in order to inhibit the thickness of the flat magnet (610) from being reduced by the disengagement prevention unit (637), the flat magnet (610) contacting the disengagement prevention unit (637) is formed with an accommodation groove (613) that accommodates the disengagement prevention unit (637). The flat magnet (610) can be formed with a thickness substantially same as that of the lateral plate (630) by forming the accommodation groove (613) at the flat magnet (610) regardless of the disengagement prevention unit (637).

Furthermore, in the exemplary embodiment of the present disclosure, the external surface of the lateral plate (630) is arranged on the same planar surface as that of the rear surface (602) of the flat magnet (610). The lateral plate (630) of the housing (690) is formed with a coupling groove (626) coupled to each coupling pillar (120) formed at each corner of upper surface (110) of the base (100, described later).

A socket groove (638) is formed across the accommodation hole (635) of the pair of lateral plate (630) opposite to the lateral plates (630) of the housing (690), and the VCM (800) is coupled to the outside circuit substrate using the socket groove (638).

The cover can (1600) includes a cover can upper plate (710) and a cover can lateral plate (720). In the exemplary embodiment of the present disclosure, the cover can (1600) may be formed by processing a metal plate capable of blocking a magnetic field or blocking a hazardous electromagnetic wave.

The cover can upper plate (710) includes an opening corresponding to the hollow hole of the bobbin (210), and an inner lateral surface of the cover can upper plate (710) is brought into contact with an upper surface of each stroke lug (640) protruded from each corner of the upper plate (620) of the housing (690).

The cover can lateral plate (720) is extended from an edge of the cover can upper plate (710) to a direction encompassing the lateral plate (630) of the housing (690), and is brought into contact with a rear surface (602) of each flat magnet (610) coupled to the accommodation hole (635) of the lateral plate (630) at the housing (690).

The flat magnet (610) is inhibited from moving backward or forward from the lateral plate (630) of the housing (690) by the contact between the rear surface (602) of the flat magnet (610) and the inner lateral surface of the cover can lateral plate (720).

The cover can lateral plate (720) blocks a magnetic field leaked from the flat magnet (610) or a hazardous electromagnetic wave. The rear surface (602) of the flat magnet (610) and the cover can lateral plate (720) may be mutually adhered by a bond.

In a case the lateral plate (630) of the housing (690) is formed with the socket groove (638), the cover can lateral plate (720) encompassing the lateral plate (630) of the housing (690) is formed with a cut-out unit (725) exposing the socket groove (638).

The base (200) functions to secure the bobbin (210), the first elastic member (300), the stator (600) and the cover can (700) (1600). The base (100) takes the shape of a cuboidal plate centrally formed with an opening (105), and is mounted at a rear surface thereof with an IR (Infrared) filter formed at a front side of an image sensor module. The IR filter functions to remove the infrared included in the outside light.

An upper surface (110) opposite to the rear surface of the base (100) is arranged with a rear surface of the bobbin (210) coupled to the first elastic member (300). Four corners of the upper surface (110) of the base (100) are formed four coupling pillars (120) perpendicularly protruded relative to each upper surface (110), and each coupling pillar (120) is coupled to the coupling groove (626) of the housing (690).

The upper surface (110) of the base (100) is formed with bosses (130) coupled to the first elastic member (300). Furthermore, the base (100) is formed with through holes (140) through which the terminal units (310) formed at the first elastic member (300) pass.

As apparent from the foregoing, the present disclosure has an advantageous effect in that a flat-shaped flat magnet opposite to a coil block and generating a magnetic field is formed at an accommodation hole formed at a lateral plate of a housing, and a disengagement prevention unit is formed at the lateral plate to inhibit the flat magnet from being disengaged to enhance the performance of VCM.

Figure 20:
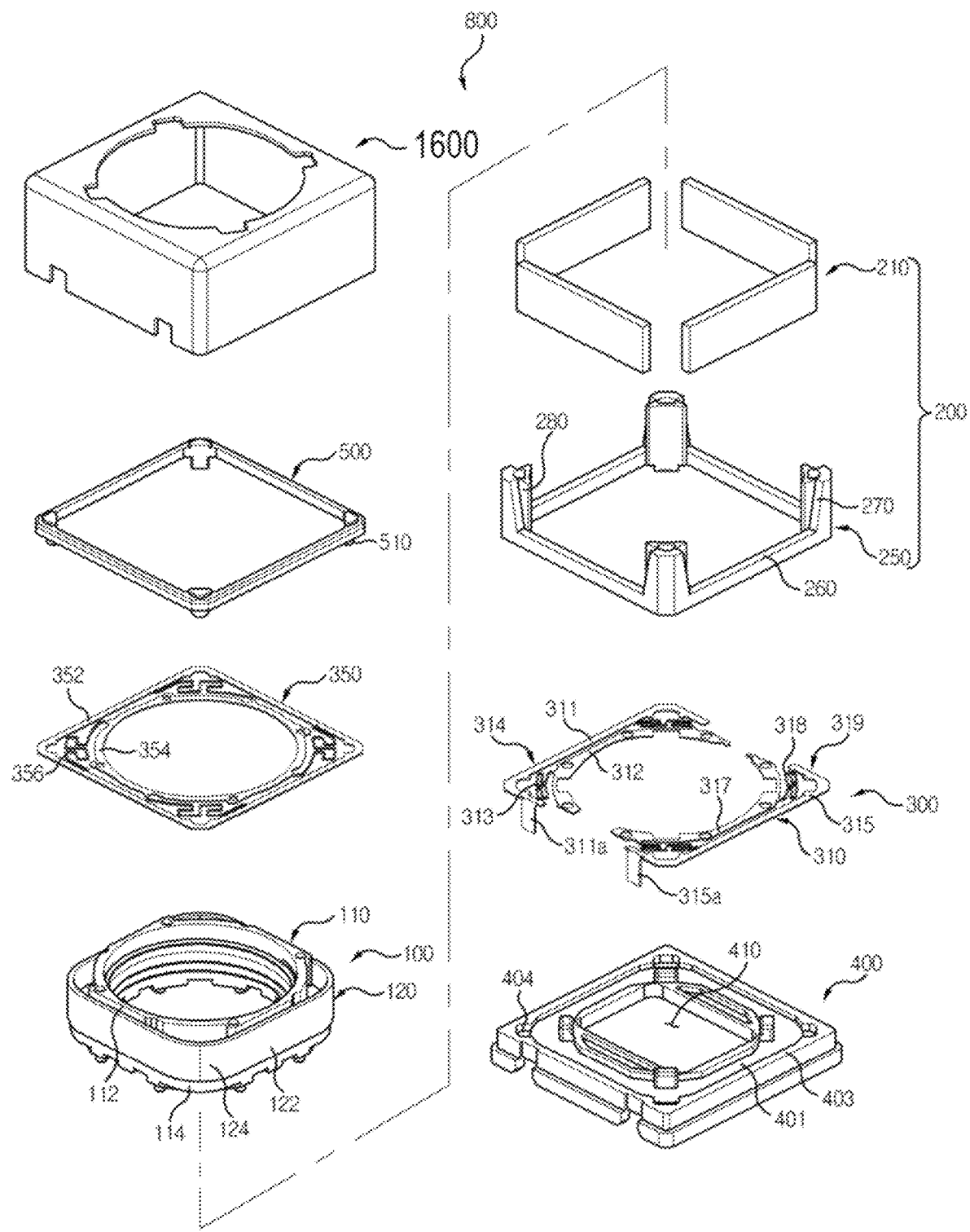
FIG. 20 is an exploded perspective view of a VCM according to an exemplary embodiment of the present disclosure.
Figure 21:
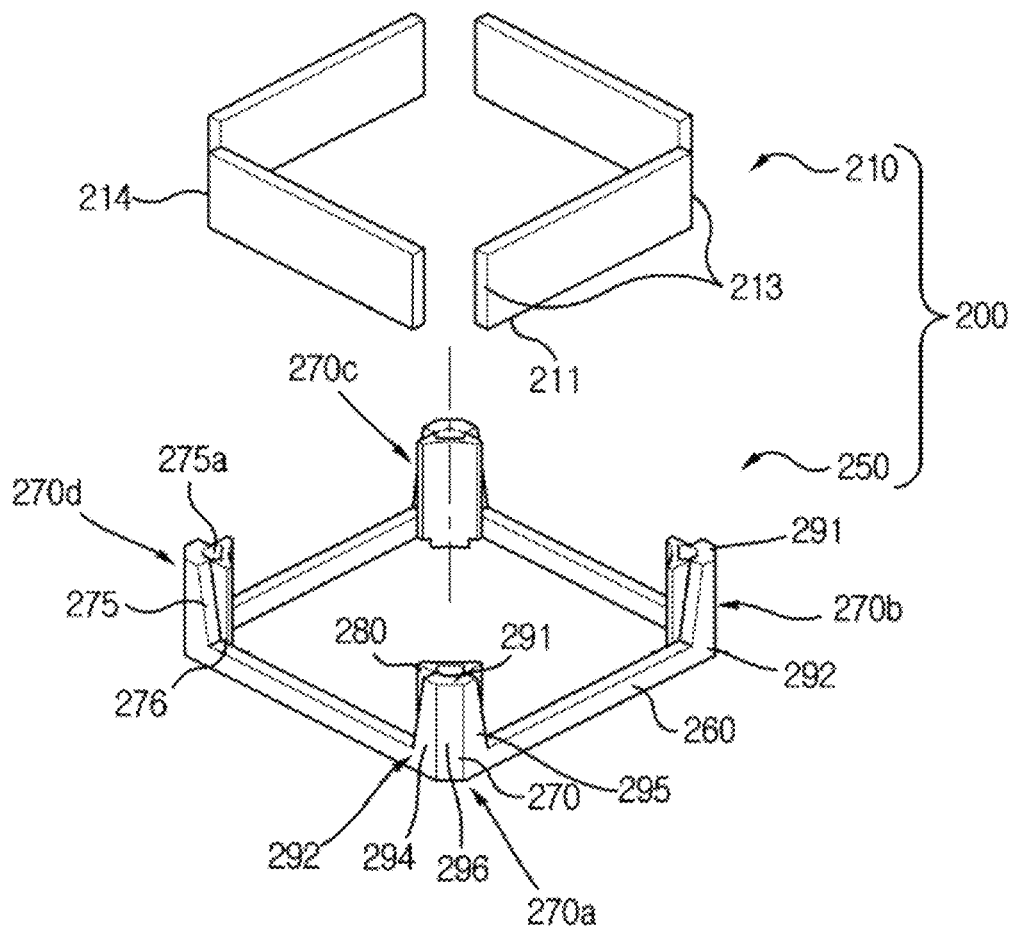
FIG. 21 is an exploded perspective view of a flat magnet and a bottom spacer in FIG. 20.
Figure 22:
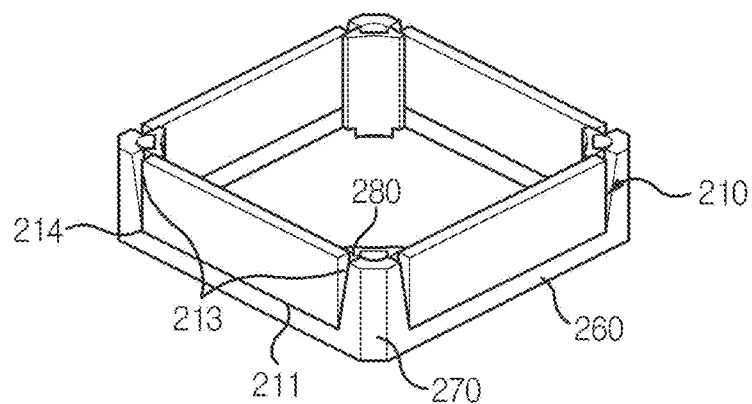
FIG. 22 is an assembled perspective view of a flat magnet and a bottom spacer in FIG. 21.
Figure 23:
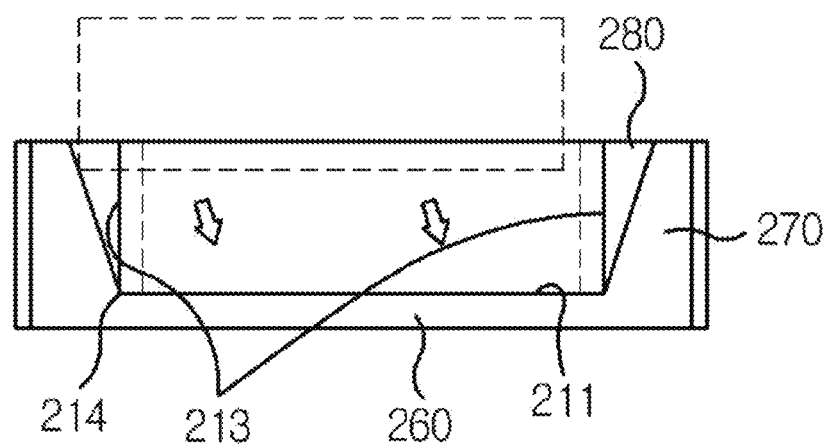
FIG. 23 is a front view of a flat magnet coupled to the bottom spacer of FIG. 22.

FIG. 20 is an exploded perspective view of a VCM according to an exemplary embodiment of the present disclosure, FIG. 21 is an exploded perspective view of a flat magnet and a bottom spacer in FIG. 20, FIG. 22 is an assembled perspective view of a flat magnet and a bottom spacer in FIG. 21, and FIG. 23 is a front view of a flat magnet coupled to the bottom spacer of FIG. 22.

Referring to FIGS. 20 through 23, a VCM (800) includes a rotor (100), a stator (200), an elastic member (300) and a base (400). The VCM (800) may further include an upper spacer (500) and a cover can (1600). The rotor (100) includes a bobbin (110) and a coil block (120).

The rotor (100) includes a lens, and distances the embedded lens from an image sensor secured to the base (400) to change a gap between the lens and the image sensor.

The bobbin (110) takes the shape of a hollow hole-formed cylinder, and is secured therein with a lens. In order to secure the lens to an inner surface of the bobbin (110), the inner surface of the bobbin (110) may be formed with a screw thread. A periphery of the bobbin (110) is formed with four planar units (112), for example, and each of the four planar units (112) is distanced from the other at an equal predetermined gap.

Meanwhile, a bottom end of the periphery of the bobbin (110) is formed with a support unit (114) for supporting the coil block (120, described later), and the support unit (114) is formed by protruding from the bottom end of the periphery of the bobbin (110).

The coil block (120) is formed by winding an insulation resin (such as enamel resin) coated long wire. The coil block (120) takes the shape of a barrel arranged at the periphery of the bobbin (110). The coil block (120) takes the shape of a square barrel with upper surface and a bottom surface opened.

In a case a current is applied to the coil block (120) wound with a wire in the shape of a cylinder, a magnetic field is generated from the coil block (120). The coil block (120) inserted into the periphery of the bobbin (110) includes four planar surfaces (122) which are same as the four planar units (112) of the bobbin (110), and four curvatures (124) connecting the planar surfaces (122).

Referring to FIGS. 21 and 22, the stator (200) includes a flat magnet (210) and a magnet fixing member (250). The flat magnet (210) may take the shape of a cuboidal plate, for example. A front surface (212) opposite to the coil block (120) on the flat magnet (210) of cuboidal shape is arranged opposite to each planar surface (122) of the coil block (120), whereby the number of flat magnets (210) is same as that of the planar surface (122) at the coil block (120).

In the exemplary embodiment of the present disclosure, each of the four flat magnets (210) is arranged opposite to each of the four planar surfaces (122), and each of the four flat magnets (210) is mutually perpendicularly arranged. Each of the flat magnets (210) may be a two-pole flat magnet or a four-pole flat magnet.

The magnet fixing member (250) serves to secure a bottom elastic member (310) of the elastic member (300, described later) and the flat magnets (210) as well. The magnet fixing member (250) includes a frame unit (260), a pillar unit (270) and a fixing unit (280) in order to fix the bottom elastic member (310) and each of the flat magnets (210).

The frame unit (260) supports each bottom surface of four flat magnets (210), and takes the shape of a square frame having an opening when viewed in a top plan view, in order to support the bottom surface (211) of the four flat magnets (210).

The pillar unit (270) is protruded from an upper surface of the frame unit (260) opposite to both lateral surfaces (213) of each flat magnet (210). In the exemplary embodiment of the present disclosure, each of the pillar unit (270) is protruded from the upper surface of the frame unit (260) corresponding to the adjacent pair of flat magnets (210). Referring to FIG. 21, The pillar units (270) can include a first pillar unit (270a), a second pillar unit (270b), a third pillar unit (270c), and a fourth pillar unit (270d), and each of the pillar units (270a, 270b, 270c, 270d) is protruded from each corner of the upper surface of the frame unit (260), respectively. The pillar units (270) can each include a first end (291) and a second end (292) opposite to the first end (291), the second end (292) being closer to the frame unit (260) than is the first end (291). A first direction from the first end (291) of the first pillar unit (270a) and the first end (291) of the second pillar unit (270b) to the second end (292) of the first pillar unit (270a) and the second end (292) of the second pillar unit (270b) is closed by the frame unit (260), and a second direction from the second end (292) of the first pillar unit (270a) and the second end (292) of the second pillar unit (270b) to the first end (291) of the first pillar unit (270a) and the first end (291) of the second pillar unit (270b) is opened. A thickness of the first end (291) of the pillar units (270) can be smaller than a thickness of the second end (292) of the pillar units (270). Each pillar unit (270) can include a first outer lateral surface (294) that faces a first lateral plate of the cover (600), a second outer lateral surface (295) facing a second lateral plate of the cover (600), and a third outer lateral surface (296) that connects the first (294) and second (295) outer lateral surfaces and faces a corner part of the cover (600).

Each of the pillar units (270) opposite to both lateral surfaces (213) of each flat magnet (210) is formed with an inclined guide unit (275) to allow the flat magnet (210) to be smoothly inserted.

While the flat magnet (210) is supported to the upper surface of the frame unit (260), corners (214) formed by a bottom end (276) of the guide unit (275), a lateral surface (213) and the bottom surface (211) of the flat magnet (210) meet each other. In a case the distal end of the guide unit (275) and the corners (214) of the flat magnet (210) meet, the flat magnet (210) is fixed to a designated position of the bottom spacer (200).

Meanwhile, as the guide unit (275) is inclined, the flat magnet (210) can be arranged on the frame unit (260) along the guide unit (275) formed at each of the pair of pillar units (270) as illustrated in FIG. 4, in a case the flat magnet (210) is arranged on the upper surface of the frame unit (260).

Alternatively, in a case the inclined guide unit (275) is not formed at the pillar unit (270) formed at the frame unit (260), it is difficult to accurately insert a very small-sized flat magnet (210) into a very small-sized pillar unit (270) to generate frequent assembly defects and to take a lot of time in assembly.

The fixing unit (280) is extended from an inner lateral surface of each pillar unit (270) formed at the frame unit (260) to a direction facing the front surface of the flat magnet (210), and each flat magnet (210) is supported by the fixing unit (280).

The elastic member (300) includes a bottom elastic member (310) and an upper elastic member (350). Two bottom elastic members (310) are formed in a pair. The bottom elastic member (310) formed in a pair is hereinafter defined as a first bottom elastic member (314) and a second bottom elastic member (319).

The first and second bottom elastic members (314, 319) include external elastic units (311, 315) formed in the shape corresponding to that of the frame unit (260) of magnet fixing member (250), inner lateral elastic units (312, 317) secured to the bottom surface of the bobbin (110) and connection elastic units (313, 318) connecting the external elastic units (311, 315) and the inner lateral elastic units (312, 317). The connection elastic units (313, 318) elastically support the bobbin (110).

In the exemplary embodiment of the present disclosure, the inner lateral elastic units (312, 317), the external elastic units (311, 315) and the connection elastic units (313, 318) of the first and second bottom elastic members (314, 319) are integrally formed.

Meanwhile, the external elastic units (311, 315) of the first and second bottom elastic members (314, 319) are respectively formed with terminal units (311a, 315a), and the terminal units (311a, 315a) are bent from the external elastic units (311, 315) to the bottom. The upper elastic member (350) elastically supports the bobbin (110) by being coupled to the upper surface of the bobbin (110).

The upper elastic member (350) includes a square frame-shaped external elastic unit (352), and an inner lateral elastic unit (354) coupled to the upper surface of the bobbin (110) and a connection elastic unit (356) connecting the external elastic unit (352) and the inner lateral elastic unit (354).

Four corners of the external elastic unit (352) of the upper elastic member (350) are arranged on an upper surface of each pillar unit (270) of the magnet fixing member (250). The base (400) secures the rotor (100), the stator (200) and the bottom elastic member (310) of the elastic member (300). The base (400) takes the shape of a square plate, and is formed with an opening (410) corresponding to the hollow hole of the bobbin (110).

An edge of an upper surface (401) of the base (400) is formed with a lug (403) contacting the external elastic units (311, 315) of the bottom elastic member (310), and an edge of the upper surface (401) of the base (400) is formed with a coupling groove (404) coupled to the coupling lug protruded from the bottom surface of the frame unit (260) of the magnet fixing member (250).

The bottom elastic member (310) is interposed between the frame unit (260) of the magnet fixing member (250) and the lug (403) of the base (400), and the bottom elastic member (310) is secured by the base (400) and the frame unit (260) of the magnet fixing member (250).

The upper spacer (500) is arranged at an upper surface of the upper elastic member (350). The upper spacer (500) is formed in a shape corresponding to the frame unit (260) of the magnet fixing member (250) and is a size corresponding to that of the frame unit (260). A coupling lug (510) is formed at a position corresponding to the pillar unit (270) of the magnet fixing member (250), and the coupling lug (510) formed at the upper spacer (500) is coupled to a coupling hole (275a) formed at the upper surface of the pillar unit (270) of the magnet fixing member (250).

The upper elastic member (350) is coupled to the magnet fixing member (250) and the upper spacer (500) by coupling between the coupling hole (275a) formed at the pillar unit (270) of the magnet fixing member (250) and the coupling lug (510) of the upper spacer (500).

The cover can (1600) includes an upper plate (610) and a lateral plate (620). The upper plate (610) is formed with an area substantially the same as that of the base (400), and is centrally formed with an opening exposing the bobbin (110). The lateral plate (620) is extended to a direction facing the base (400) from an edge of the upper plate (610) to be coupled to the base (400).

In inner lateral surface of the lateral plate (620) is brought into contact with a rear surface of the flat magnet (210) fixed to the magnet fixing member (250), and the lateral plate (620) functions as a yoke.

As apparent from the foregoing, the VCM according to the exemplary embodiment of the present disclosure has an advantageous effect in that a frame unit and a pillar unit protruded from the frame unit are formed on a bottom spacer, a magnet is arranged at the frame unit, and the magnet is fixed by protruding a guide unit from the pillar unit to reduce the number of constituent elements and assembling processes without using a yoke for fixing the conventional magnet and to increase an aperture of a bobbin and a lens mounted at the bobbin.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

The invention claimed is:

1. A voice coil motor, comprising:
a base;
a cover comprising an upper plate and a lateral plate extending from the upper plate;
a bobbin disposed in the cover;
a housing disposed between the cover and the bobbin;
an upper elastic member connecting the bobbin and the housing;
a coil disposed on an outer peripheral surface of the bobbin;
a magnet disposed between the coil and the lateral plate of the cover and facing the coil; and
a lower elastic member connecting the bobbin and an upper surface of the base,
wherein the lower elastic member comprises a first lower elastic member and a second lower elastic member spaced apart from each other,
wherein each of the first lower elastic member and the second lower elastic member comprises an inner part coupled with a lower surface of the bobbin, an outer part coupled with the base, and a connection part connecting the inner part and the outer part,
wherein the bobbin comprises a support unit protruding from an outer peripheral surface of the bobbin and disposed at a bottom of the coil, and a cut-out unit in which at least a portion of the support unit is cut,
wherein one end of the coil passes through the cut-out unit of the bobbin and is electrically connected to the inner part of the first lower elastic member,
wherein an other end of the coil passes through the cut-out unit of the bobbin and is electrically connected to the inner part of the second lower elastic member,
wherein the housing comprises an upper part, a side part extending from the upper part of the housing in an optical axis direction, and a groove recessed in the optical axis direction in the side part of the housing,
wherein the upper surface of the base comprises a protrusion protruding from an area corresponding to the groove of the housing, and
wherein the groove of the housing is disposed closer to the lower elastic member than to the upper elastic member.

2. The voice coil motor of claim 1, wherein the upper part of the housing is coupled to an upper surface of the magnet, and
wherein the side part of the housing is coupled to a side surface of the magnet.

3. The voice coil motor of claim 1, wherein the side part of the housing comprises a pillar unit in which the groove is formed and extending from a corner of the housing, and
wherein the magnet is coupled to the pillar unit.

4. The voice coil motor of claim 1, wherein the pillar unit of the housing comprises first to fourth pillar units,
wherein the groove of the housing comprises a first groove formed in the first pillar unit, a second groove formed in the second pillar unit, a third groove formed in the third pillar unit, and a fourth groove formed in the fourth pillar unit,
wherein the base comprises first to fourth protrusions, and
wherein the first protrusion of the base is coupled to the first groove of the first pillar unit of the housing, the second protrusion of the base is coupled to the second groove of the second pillar unit of the housing, the third protrusion of the base is coupled to the third groove of the third pillar unit of the housing, and the fourth protrusion of the base is coupled to the fourth groove of the fourth pillar unit of the housing.

5. The voice coil motor of claim 1, wherein the magnet comprises a lower surface facing the upper surface of the base, and
wherein a lowest end of the side part of the housing is located lower than the lower surface of the magnet.

6. The voice coil motor of claim 1, wherein the magnet comprises a lower surface facing the upper surface of the base, and
wherein a shortest distance in the optical axis direction between a lowermost end of the side part of the housing and the upper surface of the base is shorter than a shortest distance in the optical axis direction between the lower surface of the magnet and the upper surface of the base.

7. The voice coil motor of claim 1, wherein the magnet comprises an upper surface facing the upper part of the housing and a lower surface facing the upper surface of the base, and
wherein at least a portion of the groove of the housing is located between the upper surface of the magnet and the lower surface of the magnet.

8. The voice coil motor of claim 1, wherein a length of the side part of the housing in the optical axis direction is longer than a length of the magnet in the optical axis direction.

9. The voice coil motor of claim 1, wherein the protrusion of the base is formed at corners of the base, and
wherein the groove of the housing is not overlapped the magnet in the optical axis direction.

10. The voice coil motor of claim 1, wherein the magnet comprises a lower surface facing the upper surface of the base, and
wherein a distance between the lower surface of the magnet and the upper part of the housing is shorter than a distance between the protrusion of the base and the upper part of the housing.

11. A voice coil motor, comprising:
a base;
a cover comprising an upper plate and a lateral plate extending from the upper plate;
a bobbin disposed in the cover;
a housing disposed between the cover and the bobbin;
an upper elastic member connecting the bobbin and the housing;
a coil disposed on an outer peripheral surface of the bobbin;
a magnet disposed between the coil and the lateral plate of the cover and facing the coil; and
a lower elastic member connecting the bobbin and an upper surface of the base,
wherein the lower elastic member comprises a first lower elastic member and a second lower elastic member spaced apart from each other,
wherein each of the first lower elastic member and the second lower elastic member comprises an inner part coupled with a lower surface of the bobbin, an outer part coupled with the base, and a connection part connecting the inner part and the outer part,
wherein the bobbin comprises a support unit protruding from an outer peripheral surface of the bobbin and disposed at a bottom of the coil, and a cut-out unit in which at least a portion of the support unit is cut,
wherein one end of the coil passes through the cut-out unit of the bobbin and is electrically connected to the inner part of the first lower elastic member,
wherein an other end of the coil passes through the cut-out unit of the bobbin and is electrically connected to the inner part of the second lower elastic member, wherein the housing comprises an upper part, a side part extending from the upper part of the housing in an optical axis direction, and a groove recessed in the optical axis direction in the side part of the housing, wherein the upper surface of the base comprises a protrusion protruding from an area corresponding to the groove of the housing, and wherein the groove of the housing is disposed closer to the upper surface of the base than to the upper part of the housing.

12. The voice coil motor of claim 11, wherein the side part of the housing comprises a pillar unit in which the groove is formed and extending from a corner of the housing, and wherein the magnet is coupled to the pillar unit.

13. The voice coil motor of claim 11, wherein the magnet comprises a lower surface facing the upper surface of the base, and wherein a lowest end of the side part of the housing is located lower than the lower surface of the magnet.

14. The voice coil motor of claim 11, wherein the magnet comprises a lower surface facing the upper surface of the base, and wherein a shortest distance in the optical axis direction between a lowermost end of the side part of the housing and the upper surface of the base is shorter than a shortest distance in the optical axis direction between the lower surface of the magnet and the upper surface of the base.

15. The voice coil motor of claim 11, wherein the magnet comprises an upper surface facing the upper part of the housing and a lower surface facing the upper surface of the base, and wherein at least a portion of the groove of the housing is located between the upper surface of the magnet and the lower surface of the magnet.

16. A voice coil motor, comprising:

a base;

a cover comprising an upper plate and a lateral plate extending from the upper plate;

a bobbin disposed in the cover;

a housing disposed between the cover and the bobbin;

an upper elastic member connecting the bobbin and the housing;

a coil disposed on an outer peripheral surface of the bobbin;

a magnet disposed between the coil and the lateral plate of the cover and facing the coil; and a lower elastic member connecting the bobbin and an upper surface of the base, wherein the lower elastic member comprises a first lower elastic member and a second lower elastic member spaced apart from each other, wherein each of the first lower elastic member and the second lower elastic member comprises an inner part coupled with a lower surface of the bobbin, an outer part coupled with the base, and a connection part connecting the inner part and the outer part, wherein the bobbin comprises a support unit protruding from an outer peripheral surface of the bobbin and disposed at a bottom of the coil, and a cut-out unit in which at least a portion of the support unit is cut, wherein one end of the coil passes through the cut-out unit of the bobbin and is electrically connected to the inner part of the first lower elastic member, wherein an other end of the coil passes through the cut-out unit of the bobbin and is electrically connected to the inner part of the second lower elastic member, wherein the housing comprises an upper part, a pillar unit extending from the upper part of the housing in the optical axis direction, and a groove recessed in the optical axis direction in the pillar unit of the housing, wherein the upper surface of the base comprises a protrusion protruding from an area corresponding to the groove of the housing, wherein the magnet comprises an upper surface facing the upper part of the housing and a lower surface facing the upper surface of the base, and wherein the groove of the housing is disposed closer to the lower surface of the magnet than to the upper surface of the magnet.

17. The voice coil motor of claim 16, wherein the pillar unit extends from a corner of the housing, and wherein the magnet is coupled to the pillar unit.

18. The voice coil motor of claim 16, wherein the magnet comprises a side part facing the pillar unit, and wherein the side part of the magnet is coupled to the pillar unit.

19. The voice coil motor of claim 16, comprising:

an upper elastic member connecting the bobbin and the housing.

20. The voice coil motor of claim 16, wherein the outer part of the lower elastic member is connected to a terminal unit, and wherein the base comprises a hole through which the terminal unit passes.

* * * * *